Aug. 28, 1951 W. W. SLOANE 2,565,528
MECHANICAL MINER
Filed Oct. 26, 1949 13 Sheets-Sheet 9
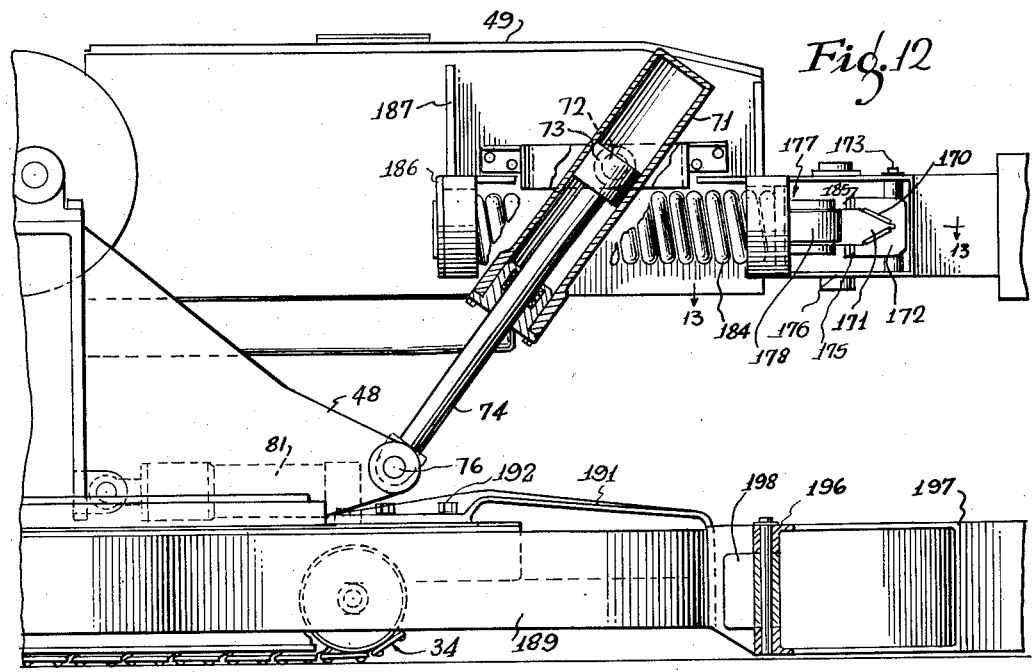
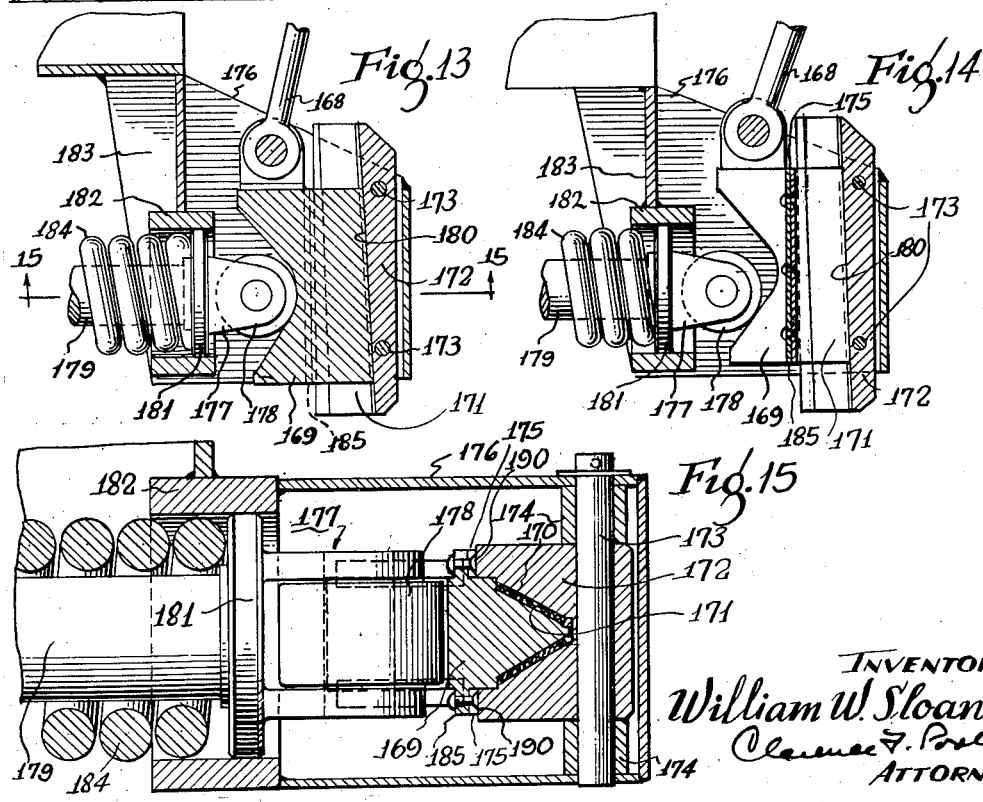
INVENTOR
William W. Sloane
Clarence T. Poole
ATTORNEY Aug. 28, 1951 W. W. SLOANE 2,565,528
MECHANICAL MINER
Filed Oct. 26, 1949 13 Sheets-Sheet 10
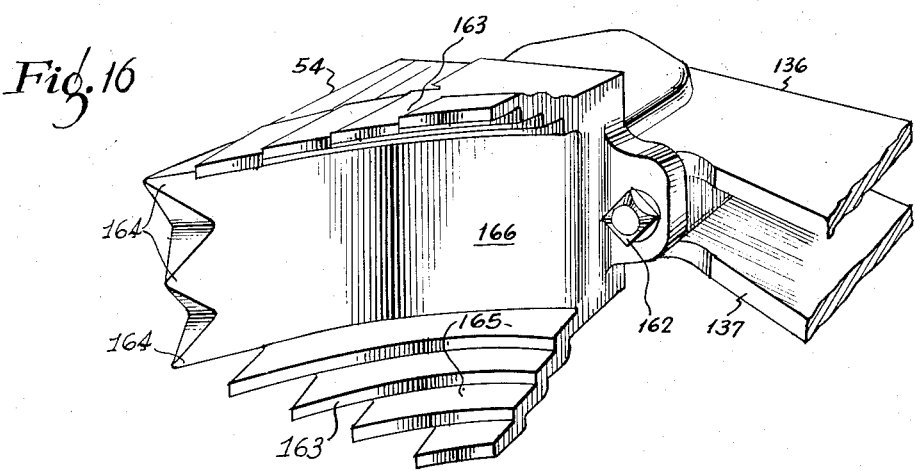
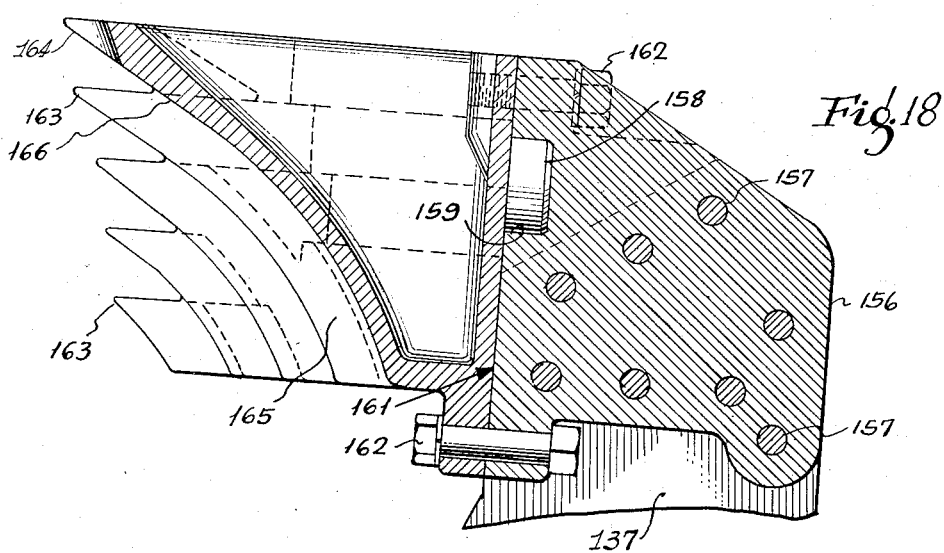
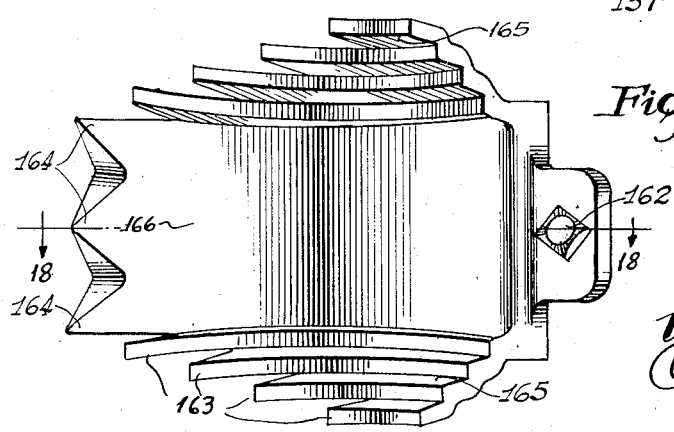
INVENTOR
William W. Sloane
Clarence F. Poole
ATTORNEY Aug. 28, 1951 W. W. SLOANE 2,565,528
MECHANICAL MINER Filed Oct. 26, 1949 13 Sheets-Sheet 11

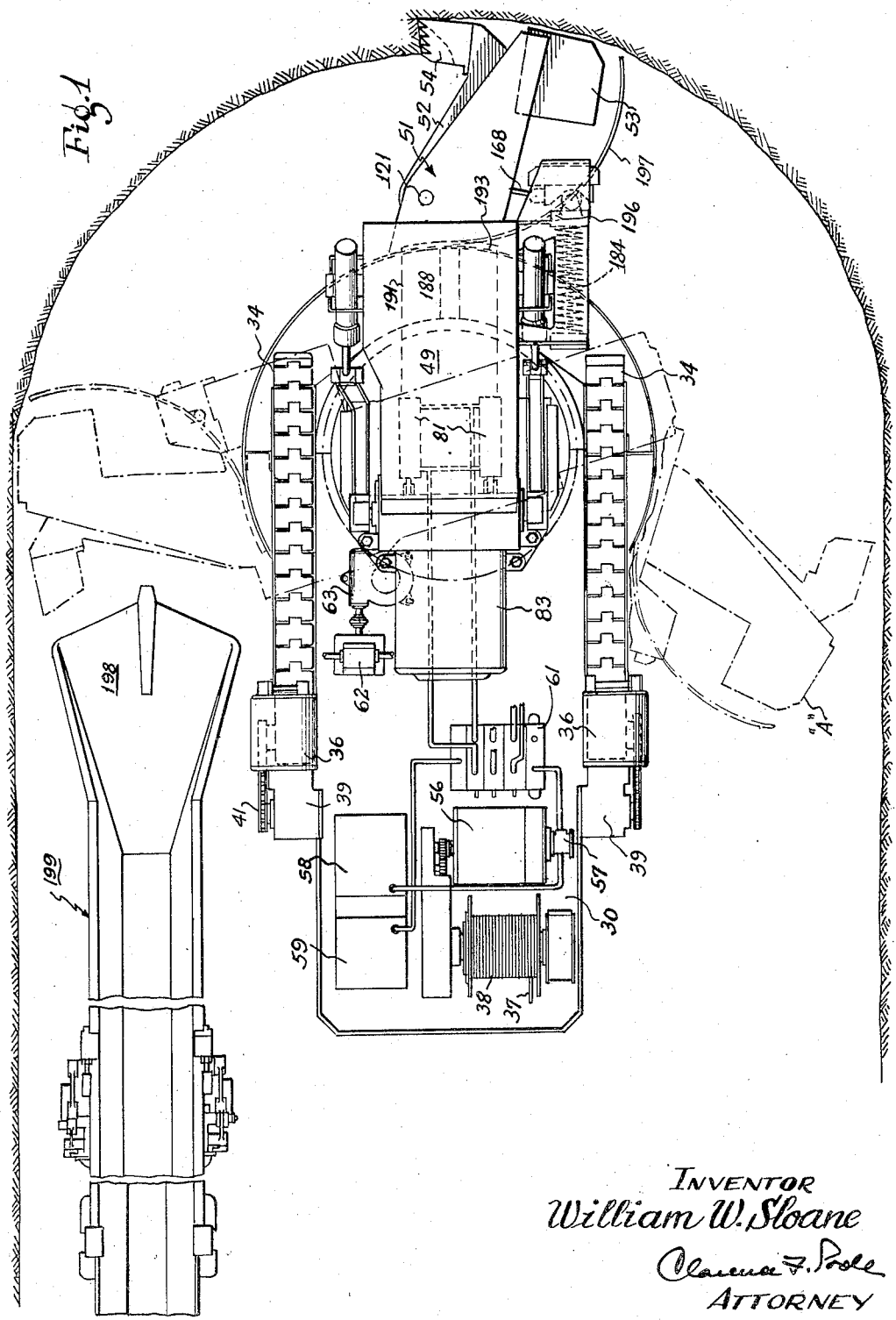

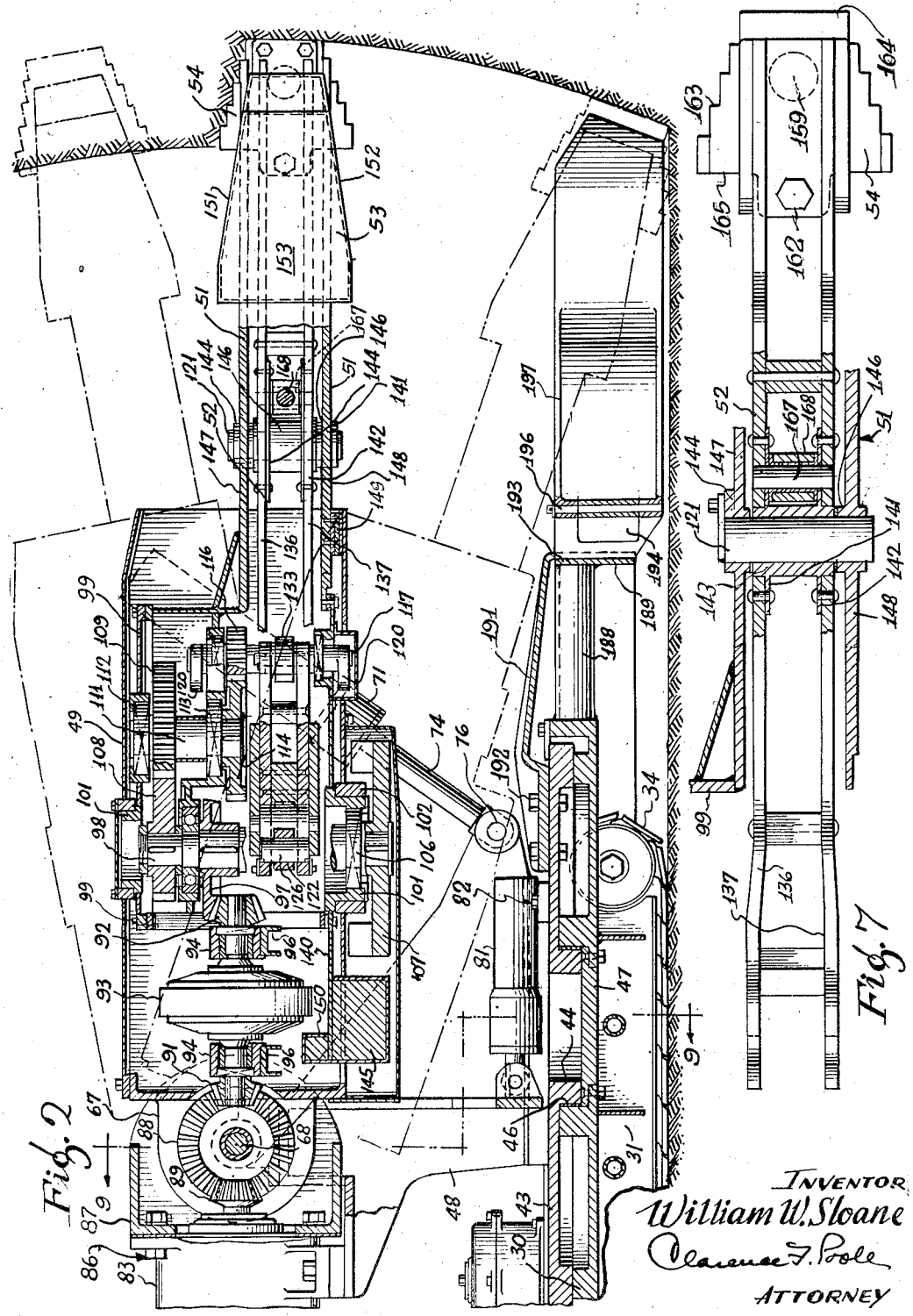

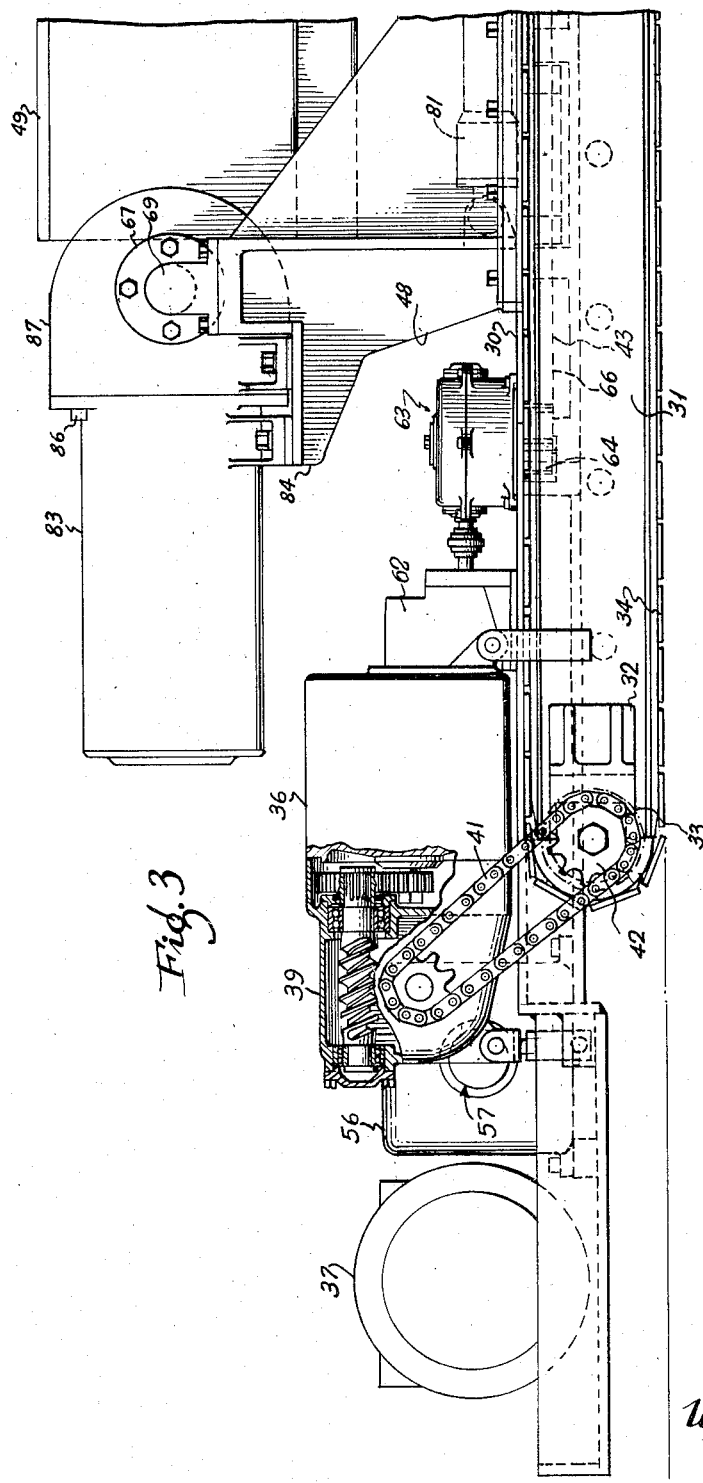

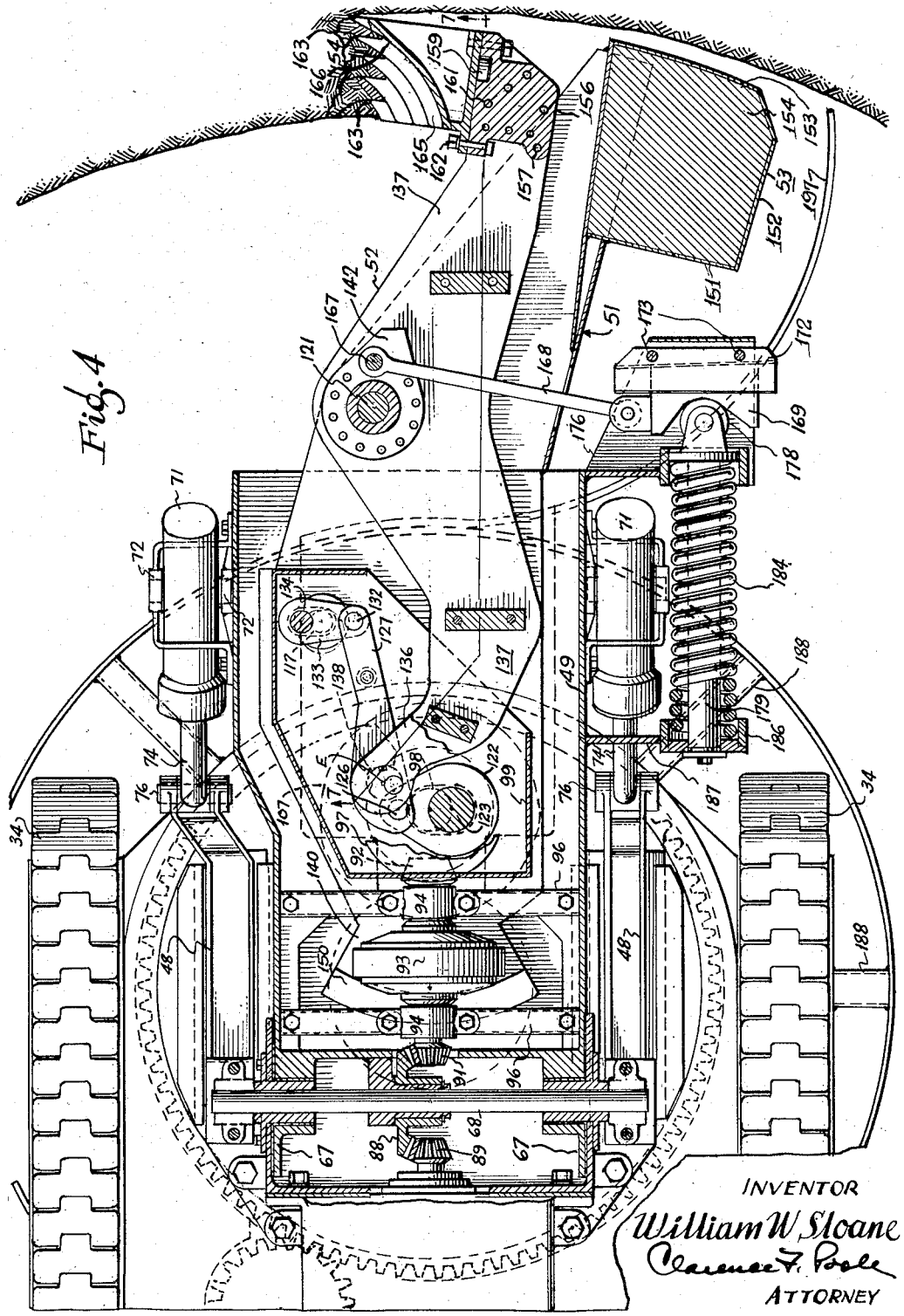

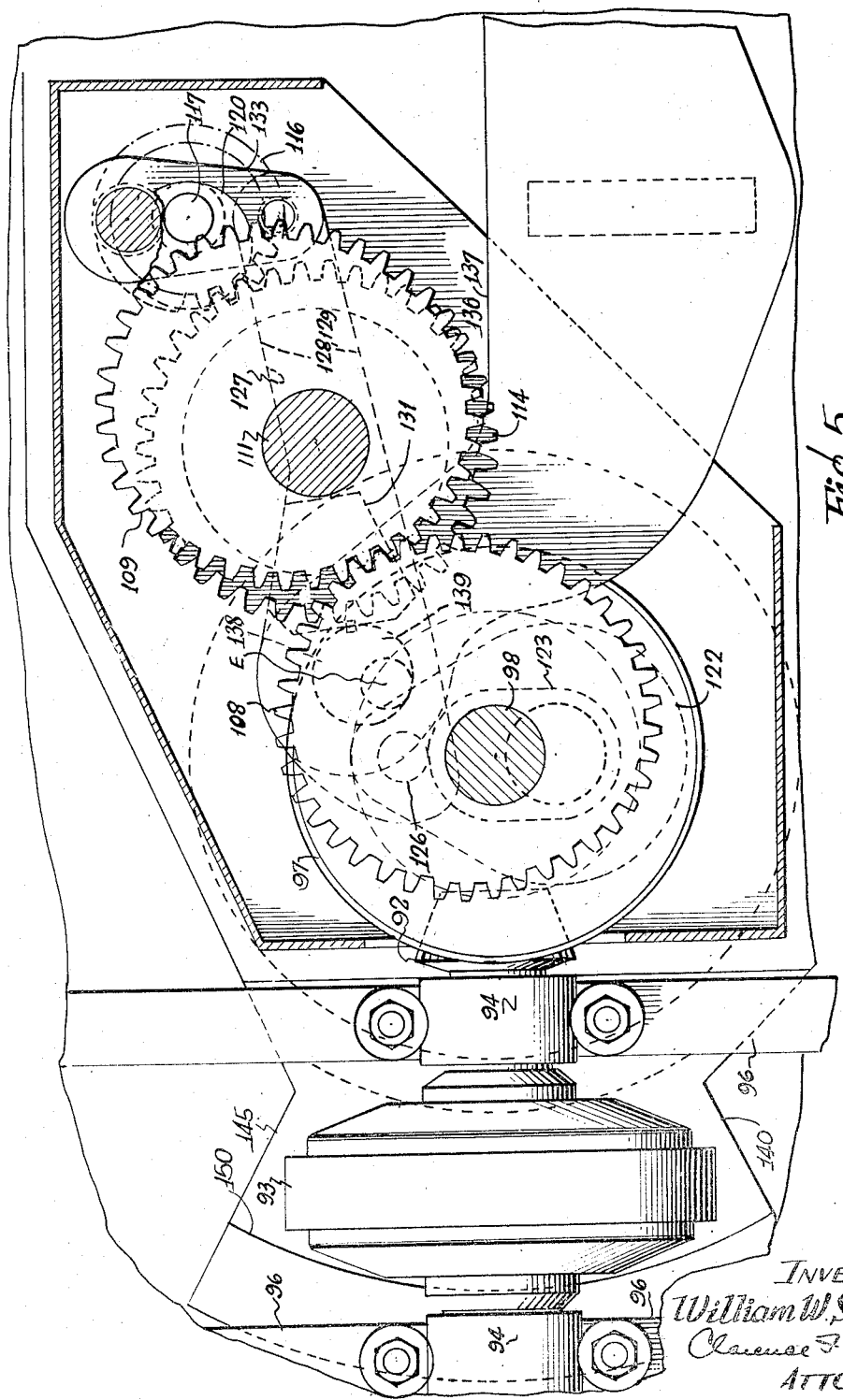

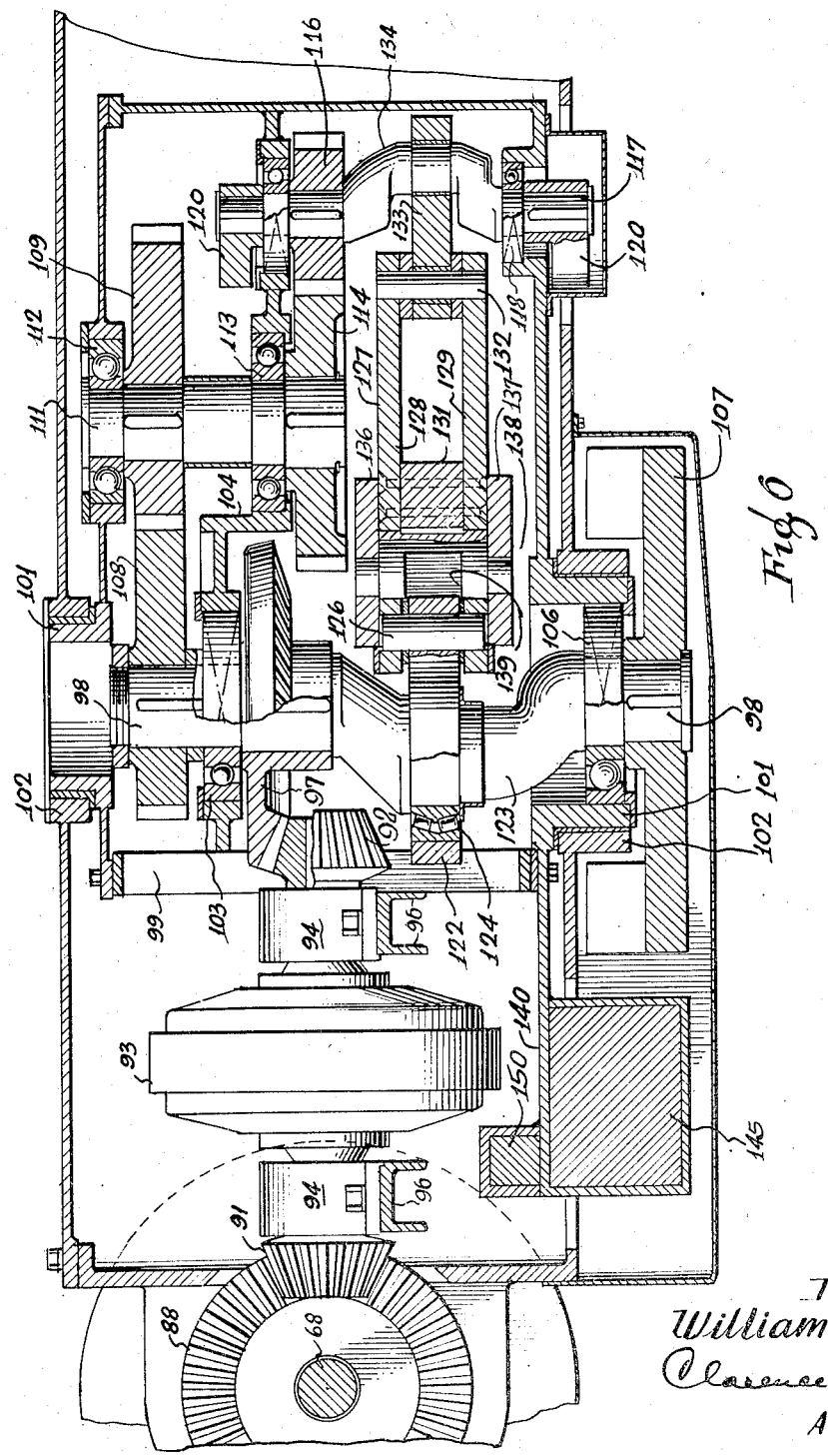

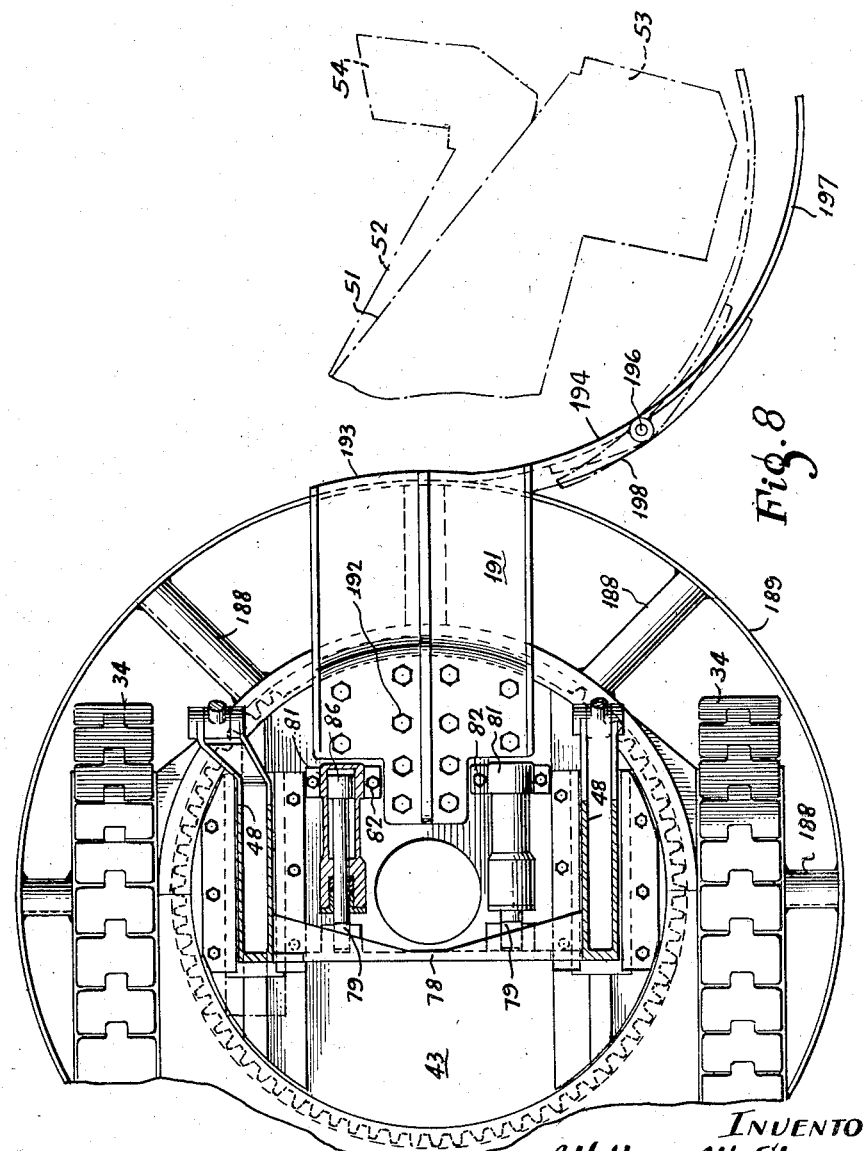

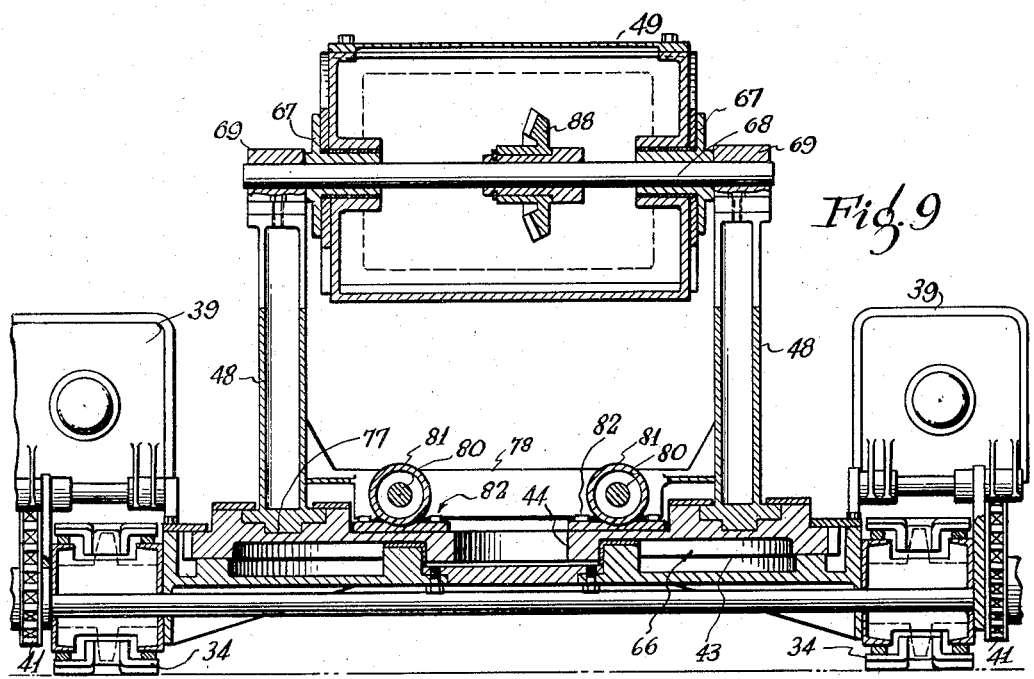
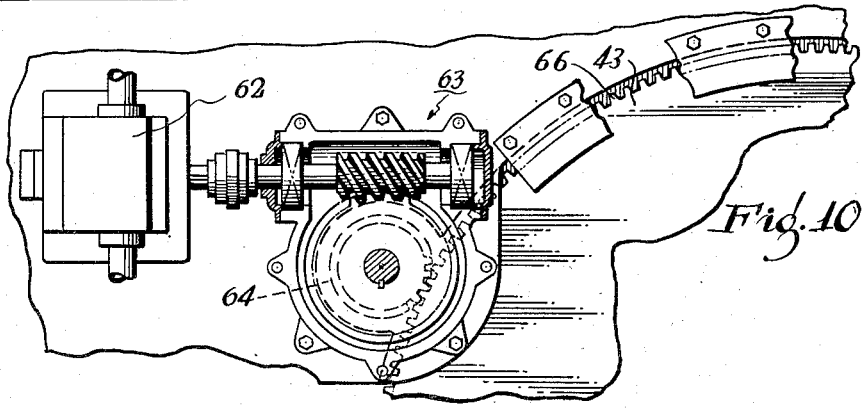
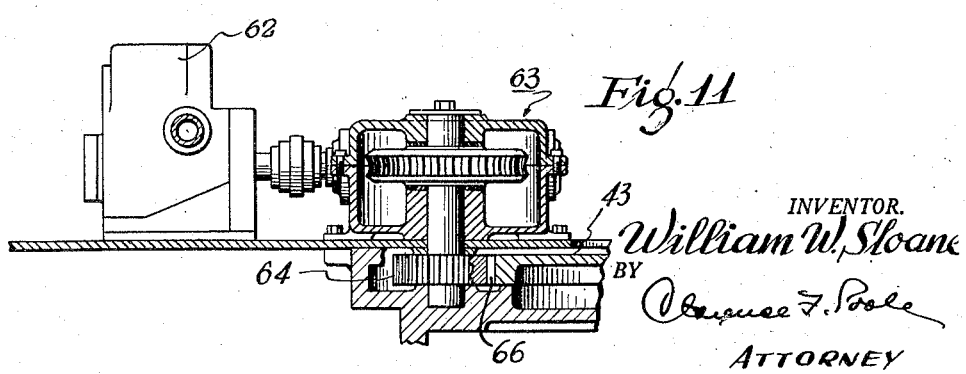

INVENTOR.
William W. Sloane
ATTORNEY

Aug. 28, 1951 W. W. SLOANE 2,565,528
MECHANICAL MINER

Filed Oct. 26, 1949 13 Sheets-Sheet 12

INVENTOR
William W. Sloane
Clarence F. Poole
ATTORNEY

Aug. 28, 1951   W. W. SLOANE   2,565,528
MECHANICAL MINER
Filed Oct. 26, 1949   13 Sheets-Sheet 13
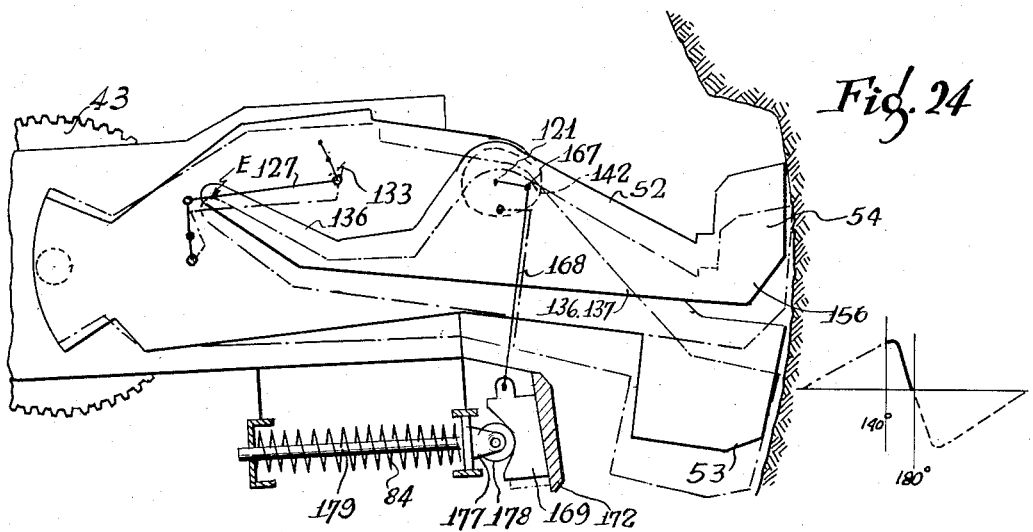
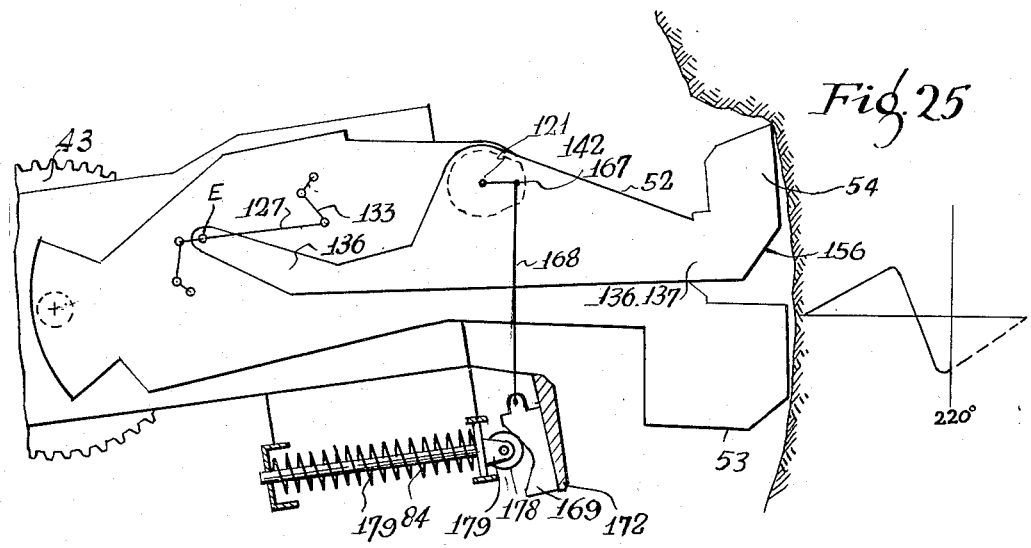
INVENTOR
William W. Sloane
Clarence F. Poole
ATTORNEY Patented Aug. 28, 1951

2,565,528

UNITED STATES PATENT OFFICE 2,565,528

MECHANICAL MINER

William W. Sloane, Chicago, Ill., assignor to Goodman Manufacturing Company, Chicago, Ill., a corporation of Illinois Application October 26, 1949, Serial No. 123,581

40 Claims. (Cl. 262—13)

This invention relates in general to mining machines and relates particularly to a mining machine for breaking down and removing frangible material from a solid working face without blasting.

Machines for mining coal underground without the use of explosives have heretofore in general dug the coal from the seam by a cutting or tearing action provided by moving steel bits mounted on chains or on a revolving drum. In some of the machines of the prior art vibrating picks have been employed to break the coal from the seam. Whatever the types of machines employed, they were open to the objection that they produced too much fine coal having a low market value or they did not mine the coal fast enough to justify their use.

Obviously, coal can be dug from a seam by main force in the same manner as a power shovel digs earth, but since the coal seam offers much more resistance, much higher forces against the dipper are necessary. It is possible, of course, to provide mechanism to take these forces, but it has heretofore been impossible to provide any suitable mechanism to take the reactions in a portable machine.

According to the present invention mechanism is provided which will provide a force for breaking the coal down from the seam, a part of the reaction and a part of the force being stored in a freely moving weight, in such a fashion that the force and its reaction against the supports for the mechanism are not the same. In such a mechanism the product of the force and its duration are equal to the product of the reaction and its duration. For example, with the proper mechanism it is possible to produce a force of 40,000 pounds for ¼ of a repeated cycle with a reaction of 10,000 pounds continuing through the entire cycle. If the maximum reaction that can be accommodated is determined and the force necessary to dig the coal is known, a mechanism can be provided that will produce both of these values, but in any case, the duration of the digging force will bear the same ratio to the duration of the cycle as the reacting force bears to the digging force. The machine according to the present invention embodies the above principle, viz., that of an intermittent high force against the coal with a continuous low reaction.

In using the foregoing principle for digging coal a weight is placed behind the cutter or work head or pick, and the two are connected together by a mechanically driven link to produce relative motion and velocity of one with respect to the other. The cutter head is designed so as to be as light as is practicable, and the size of the weight, the length of its travel relative to the cutter head and the speed of the weight are chosen to produce the desired forces against the cutter head. In applying the principle, the motion of the weight relative to the cutter head is one of low acceleration of the weight toward the cutter head followed by rapid deceleration toward the cutter head, and then followed by rapid acceleration away from the cutter head followed by slow deceleration away from the cutter head. Values are so chosen that if the cutter head is held stationary the forces of the slow acceleration toward the cutter head and the forces induced by slow deceleration away from the cutter head are somewhat less than the permissible reaction caused by the crowding mechanism of the machine and cutter head toward the coal seam. The force induced by the deceleration of the weight in moving toward the cutter head and the force induced by the acceleration of the weight away from the cutter head are such that when combined with the crowding force the sum of the two forces is in excess of the forces necessary to overcome the resistance of the coal. It is desirable that the low rates of acceleration and deceleration be equal and uniform, and that the high rates of acceleration and deceleration also be uniform. The changes from acceleration to deceleration and from deceleration to acceleration should be such that if a curve is drawn of velocity with respect to time the peaks of the curves will be parabolas. Mechanism to provide approximately such a motion is also a part of the invention.

With the foregoing considerations in mind, it is a principal object of the invention to provide a mining machine which will provide greater production with a smaller expenditure of power.

Another object is to afford a mining machine provided with a cutting head adapted to be moved into contact with a coal seam and to subject the cutting head to a cyclically varying force which varies in magnitude from a low value to a high value during a short part of the cycle, and which remains at a high value for a short part of the cycle, and then for the remainder of the cycle returns to its initial low value.

Yet another object is to provide a cutting head for a continuous miner which will be moved into contact with a seam of coal, and which will be subjected to a force which varies according to the resistance of the coal and according to a cycle as determined by the frequency and kinetic energy of a weight adapted to move with respect to the cutting head and to transmit its energy to the cutting head by a system of linkages.

Still another object is to provide a mining machine characterized by a cutting head adapted to be moved into contact with the working face of a coal seam and by a weighted arm cooperating with the cutting head through a novel linkage which will cause the weighted arm to reciprocate cyclically with desired acceleration and velocity characteristics to transfer an impulse into said cutting head by means of said linkage mechanism as determined by the change in velocity and acceleration of said weighted arm.

Yet another object of the invention comprehends the provision of a cutting head for a mining machine which will be subject to a varying load to vary the localized stress on the working face of a coal seam, and to induce such varying load in said cutting head by means of a weighted arm adapted to reciprocate with respect to said cutting head, and to transfer the momentum caused by such reciprocation into the cutting head to increase the localized stress on the working face.

Yet another object comprehends a novel linkage and drive mechanism which will afford desired acceleration and velocity characteristics to a moving weight adapted to reciprocate with respect to a cutting head and to transfer the impulses created by the change in velocity and acceleration of the moving weight into the cutting head to create a condition of localized high stress in the working face of a coal seam, and to provide such localized stress without the necessity of contact of the moving weight with the cutting head.

Other objects and important features of the invention will be apparent from a study of the following description taken together with the drawings which illustrate one embodiment of the invention which applies the principles thereof. While the invention is described in terms of an embodiment which it may assume in practice, its scope is not intended to be limited in terms of the embodiment shown nor otherwise than by the claims subjoined.

In the drawings:

Figure 1 is a general view of the improved mechanical miner according to the present invention, including loading apparatus for the material broken down from the face of the seam;

Figure 2 is a side elevation view of the front part of the mechanical miner of Figure 1 with certain parts thereof shown in vertical section;

Figure 3 is a side elevation view of the rear end of the mechanical miner of Figure 1 with certain parts thereof broken away to show details of the advancing mechanism;

Figure 4 is a detailed partly plan view of the front end of the mechcanical miner shown in Figures 1 and 2;

Figure 5 is an enlarged plan view of a portion of Figure 4 showing the driving mechanism for the cutter head and weight arm;

Figure 6 is a detail side elevation view of Figure 5, certain parts thereof being broken away and certain other parts being shown in section;

Figure 7 is a detailed substantially longitudinal cross section taken through the cutting head and the supporting arm shown in Figure 4, taken along the line 7—7 and looking in the direction of the arrows;

Figure 8 is a plan view of the front end of the mechanical miner shown in Figures 1 to 4 inclusive, showing details of the retracting mechanism and the clean-up scraper following the cutter head;

Figure 9 is a transverse section taken through the mechanical miner shown in Figures 1 and 3 along the line 9—9 of Figure 2 looking in the direction of the arrows;

Figure 10 is a fragmentary plan view showing details of the mechanism for crowding the cutting head and swinging the cutting head back to the starting position on the completion of a pass across the face of the coal seam;

Figure 11 is a vertical section taken substantially along the line 11—11 of Figure 10 and looking in the direction of the arrows;

Figure 12 is a partial side elevation view of the hoist mechanism and the crowd and buffer mechanism for the cutting head shown in Figures 1 and 3;

Figure 13 is a horizontal section taken along the line 13—13 of Figure 12 looking in the direction of the arrows;

Figure 14 is a view similar to Figure 13 showing the position of the buffer mechanism when the cutter head has advanced with respect to the crowd because of lack of resistance afforded by the coal seam to the cutter head;

Figure 15 is an enlarged vertical section taken along the line 15—15 of Figure 13;

Figure 16 is a perspective view of the cutter head shown in Figures 1 and 3, showing details of the cutters which are adapted to engage the face of a coal seam;

Figure 17 is a direct perspective view of the cutter head shown in Figure 16;

Figure 18 is a horizontal section taken along the line 18—18 of Figure 17 looking in the direction of the arrows;

Figure 19:
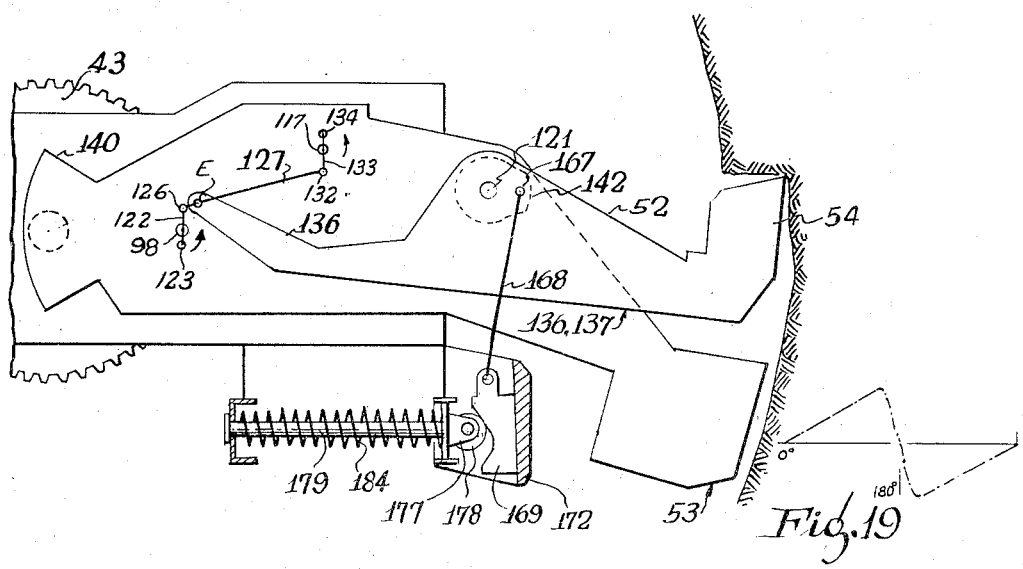
Figure 19 is a schematic plan view of the cutter head and weight arm in Figures 1 to 3 with the cutter head shown in engagement with a coal seam and the weight arm at the start of its reciprocating movement towards the cutter head and at the start of the reciprocating cycle thereof, and showing the velocity-time diagram for said weight arm relative to the cutter head.
Figure 20:
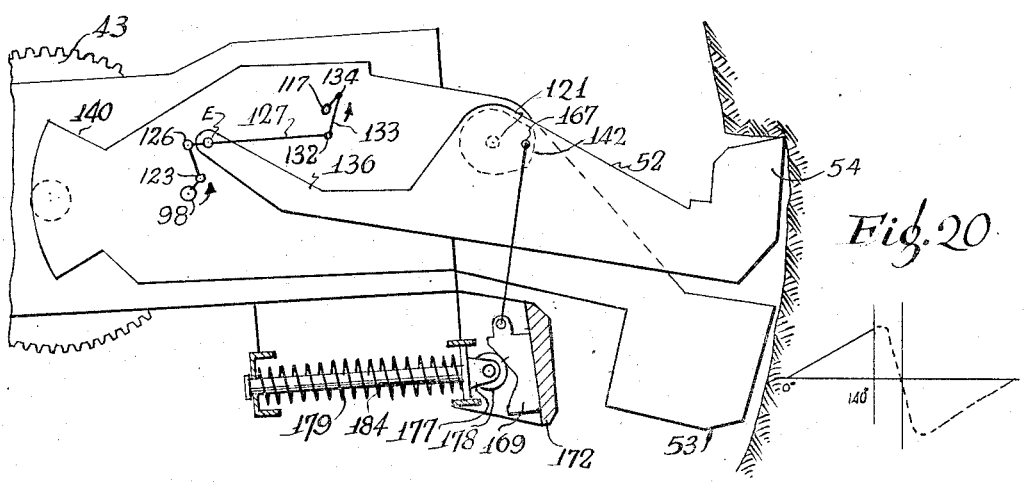
Figure 21:
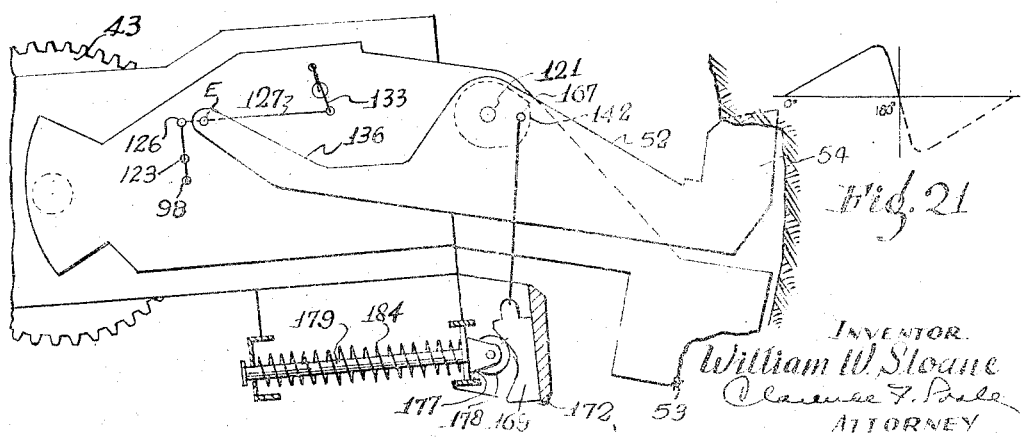
Figure 22:
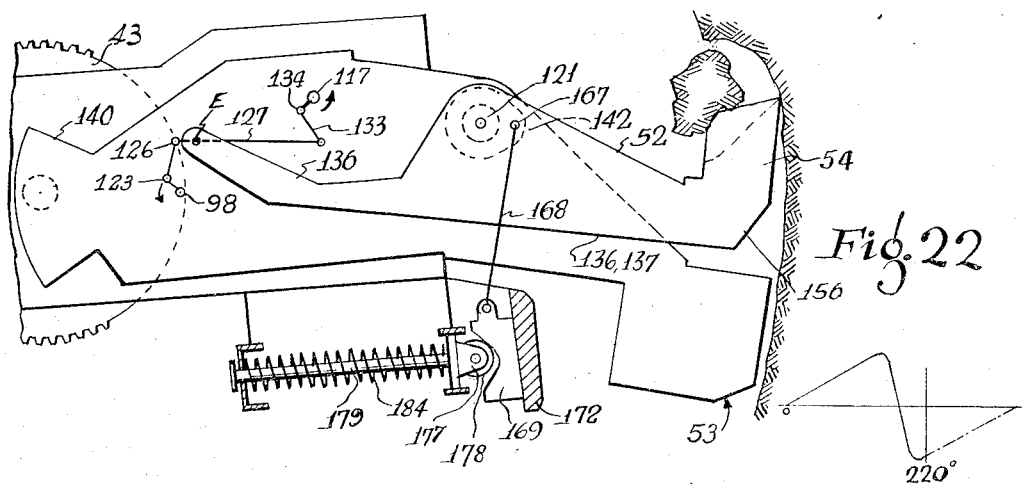
Figure 23:
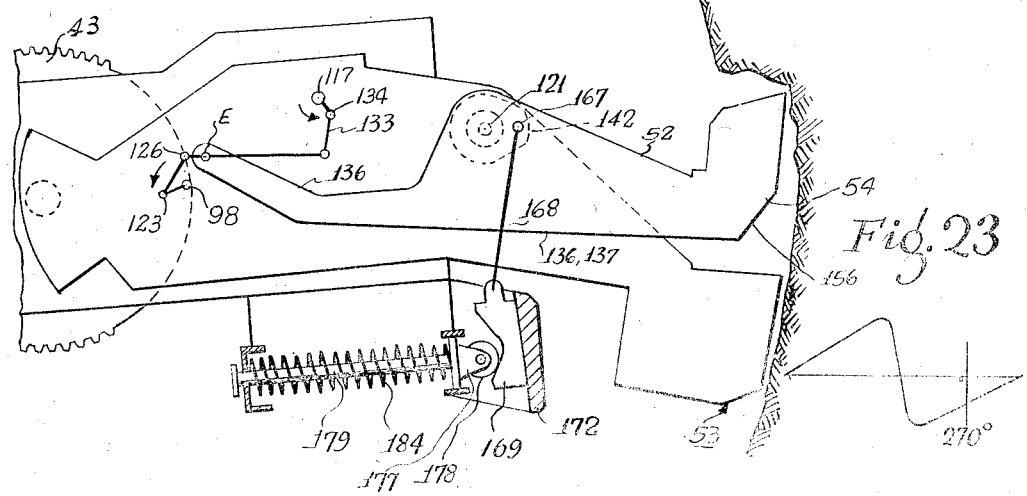

Figure 20 is a schematic diagram similar to Figure 19 showing the relative position of the cutter head and the weight arm when the main drive crank for the weight arm has been displaced from the start position by an angle of 140°, and indicating the velocity-time diagram for the weight arm relative to the cutter head for such displacement of 140° of the driving crank at the end of the period of forward acceleration of the weight arm;

Figure 21 is similar to Figures 19 and 20 and shows the relative position of the cutter head and the weight arm when the drive crank has been displaced through 180°, and indicating the velocity-time diagram for the weight arm relative to the cutter head for such displacement of 180° of the drive crank at which time the cutter head and weight arm are commencing to move relatively away from each other;

Figure 22 shows the relative position of the cutter head and weight arm and the relative velocity of the weight arm with respect to the cutter head when the main crank has been displaced through an angle of 220°, and also under a condition when material has been fragmented from the working face;

Figure 23 shows the relative position of the cutter head and the weight arm when the main drive crank has been displaced through an angle of 280°;

Figure 24 is a schematic view showing the relative position of the cutter head and weight arm when resistance to the cutter head no longer obtains and the coal has broken off from the face of the seam, and the cutter head and the weight arm start to reciprocate with respect to each other and with respect to the support frame therefor; and Figure 25 shows the relative position of the cutter head and the weight arm when the crowd is moving the cutter head against the working face to afford crowding resistance against the coal face, the cutter head and weight arm being in the same relative position as shown in Figure 22.

General description of the machine

Referring now to Figures 1 to 4 inclusive of the drawings, the continuous miner according to the present invention includes a main frame 30 having dependent sides 31 upon which are mounted supports 32 for driving sprockets 33 of endless crawler treads 34. The crawler treads 34 are driven by a pair of motors 36 which are supplied with power through a cable 37 trained around a take-up reel 38, an arrangement conventional for self-propelled vehicles in the mining industry. Each motor 36 operates through a gear reducer 39 mounted on each side of the frame 30 to drive a chain 41 which is trained around a drive sprocket 42 associated with each endless crawler tread 34.

The forward end of the main frame 30 supports a turntable 43 which is provided with a hub 44 adapted to turn in a vertical bearing 46 formed in the main frame 30, the hub 44 resting upon a closure plate 47 bolted along its periphery inside of the bearing 46. The turntable 43 supports a pair of standards 48 and a housing 49 adapted to move pivotally with respect to the latter on a horizontal axis. The housing 49 provides a trunnion support for a horizontally swinging weight arm, indicated generally at 51, and a cutter head arm 52. The weight arm 51 has a weight 53 mounted at the end thereof, and the cutter head arm 52 has a cutter head 54 mounted at the end thereof, see also Figure 16.

Means are provided, as will be described later in this specification, for causing the weight arm 51 and the weight 53 to reciprocate with respect to the cutter head arm 52 and the cutter or work head 54 and to transmit its momentum into the cutter head 54 to afford a condition of localized stress at points of contact of the cutter head 54 with the coal seam. The cutter head arm 52 and the weight 51 are connected by a novel linkage, as will be described, which enables the momentum of the weight 53 to be transmitted in the form of an impulse into the cutter head 54.

Means are provided for rotating the turntable 43 together with the standards 48 and the frame 49 to cause the cutter head 54 to crowd against the face of the coal seam. To this end the frame 30 supports a fluid pressure system which includes a drive motor 56, a fluid pump 57, a tank 58 and an accumulator 59. A bank of selector valves 61 are included in the system and may be operated selectively to control, among other things the operation of a fluid motor 62 mounted on the main frame 30 adjacent to the turntable 43. Referring now particularly to Figures 10 and 11, the fluid motor 62 is connected through gearing indicated generally at 63 to drive a pinion 64 meshing with a ring gear 66 secured in any convenient manner to the periphery of the turntable 43.

Means are provided for pivoting the housing 49 with respect to the standards 48 for raising and lowering the cutter head arm 52 and the cutter head 54 and the weight arm 51 and the weight 53 as a unit with respect to the working face of the coal seam. As shown with particular reference to Figures 3, 9 and 12, the housing 49 is formed with a pair of trunnions 67 which are mounted on a shaft 68 supported at its ends in bearings 69 resting upon the standards 48. Each side of the housing 49 is provided with a double acting cylinder 71 which is pivoted thereto at 72, and which is adapted to cooperate with a piston 73 and a piston rod 74 pivotally connected at 76 to each of the standards 48. It will be apparent that when pressure fluid is admitted to either side of the piston 73 by the selector valve 61, the frame and the cutter arm 52 and the weight arm 51 will be raised or lowered as desired.

Referring now to Figures 3, 8 and 9, in order to retract the cutter head 54, the weight arm 51 and the housing 49 with respect to the working face, the standards 48 are mounted to move in slots 77 formed on each side of the turning center of the turntable 43. The standards 48 are concented by a yoke 78 which is pivotally connected to piston rods 79 and pistons 80 movable with respect to hydraulic cylinders 81, which are fastened as at 82 to the turntable 43. It will be apparent that when fluid is admitted to either side of the pistons 80 by the selector valve 61, the standards 48 will move horizontally with respect to the turntable 43 along the slots 77.

Driving mechanism for the cutter head and weight arm

Drive means are provided for causing the weight arm 53 to reciprocate with respect to the cutter head 54 irrespective of the position of the frame 49 with respect to the turntable 43. As shown with particular reference to Figures 2 and 3, the supports 48 have mounted thereon a drive motor 83 which is supported on mounting brackets 84 fastened to the standards 48 in any convenient manner. The motor 83 is also secured as at 86 to a gear housing 87 which encloses an idler bevel gear 88 and a motor drive gear 89 which meshes therewith. The idler bevel gear 88 is mounted on the shaft 68, see also Figure 9, the longitudinal axis of which forms the center of pivotal movement of the housing 49. The idler gear 88 meshes with a bevel pinion 91 which is drivably connected to a pinion 92 through a fluid coupling 93. The pinions 91 and 92 and the fluid coupling 93 are supported in journals 94 which rest upon stiffener members 96 for the housing 49, see also Figure 5. The bevel pinion 92 meshes with a bevel gear 97 fast on a crank shaft 98 which is mounted in a carriage 99 supported on trunnions 101 adapted to turn in bearings 102 formed in the housing 49. The carriage 99 extends toward the front end of the housing 49 and is connected to the arm 51 which supports the weight 53.

The crankshaft 98 is supported in a bearing 103 mounted in a support 104 formed as a part of the carriage 99. The crankshaft 98 is additionally journaled in a bearing 106 supported inside the lower trunnion 101, see particularly Figure 6. The crankshaft 98 is provided with a flywheel 107 secured at the lower end thereof. The flywheel 107 stores the energy contained in the weight 53 at its point of maximum velocity through the period when the weight 53 is at and near being stationary, and the flywheel 107 releases its energy to the weight 53 by slowing down, and conversely absorbs energy from the weight 53 in speeding up.

To prevent these rapid changes in speed of the flywheel 107 from being imposed on the motor 83, the fluid clutch 93 is interposed between the flywheel 107 and the motor 83.

The crank shaft 98 has fast thereto an eccentric gear 108 which meshes with another eccentric gear 109 fast upon a stub shaft 111 mounted in bearings 112 and 113 in the carriage 99. The stub shaft 111 has fast thereto a gear 114 which meshes with a pinion 116 fast upon a crank shaft 117 also journaled in bearings 118 and 119 supported by the carriage 99. The crank shaft 117 is counterbalanced by weights 120 secured to the ends thereof.

The gears 108 and 109 may be of the type as disclosed in my co-pending application filed October 11, 1946, for Gearing, or of the type as may be manufactured in Hlinsky application Ser. No. 711,745, filed November 22, 1946, Apparatus for Producing Varying Speed Gearing, or Holstein application Ser. No. 733,839, filed March 11, 1947, Methods and Apparatus for Producing Varying Speed Gearing. The details of the gears 108 and 109 form no part of the present invention except as they may be designed to give a speed to the shaft 111 which varies with respect to the speed of the crankshaft 98 in any desired fashion. The gear 114 and the pinion 116 are chosen so that the ration of the speed of the crankshaft 117 with respect to the shaft 111 will be in any desired ratio, which for purposes of this description are in the ration of 2 to 1.

Means are provided in the from of a floating linkage 127 between the crankshaft 98 and the crankshaft 117, the linkage having a selected point E thereon which is on a radius with a center 121, see Figures 4 and 5. The selected point E has a motion which is proportional to the relative movement between the cutter head 54 and the weight 53, and which is proportional to the velocity of the weight 53 when the cutter head 54 is immobile and is contacting the face of the coal seam. As shown with a particular reference to Figures 2, 4, 5 and 6, the crankshaft 98 cooperates with a connecting rod 122 turning about a bearing 124 on a throw 123 of the crankshaft 98. The connecting rod 122 is pivotally connected by a pin 126 to the link 127 which is formed of a pair of plate-like members 128 and 129 connected together by a spacer block 131. The link 127 is connected by a pin 132 to a connecting rod 133 which has a floating connection with a throw 134 of the crankshaft 117.

The cutter head arm 52 consists of a pair of spaced plate-like members 136 and 137 which are connected by a pin 138 to the linkage 127. The pin 138 has an eccentrically offset portion, intermediate plates 136 and 137, provided with a recess 139 to provide clearance for the connecting rod 122 mounted on the throw 123 of the crankshaft 98. The point of pivotal connection of the platelike members 136 and 137 to the linkage 127 is at the selected point E which has the motion which is proportional to the velocity of the weight 53 when the cutter head 54 is immobile.

A pivoted connection is provided between the cutter head arm 52 and the weight arm 51, and as shown with particular reference to Figures 2 and 4, the spaced plate members 136 and 137 are provided respectively with stiffener plates 141 and 142 which support a bushing 143. The pin 121 is freely mounted within the bushing 143 and is held in place by collars 144 and 146 which engage arm members 147 and 148 of the weight arm 51. The arm members 147 and 148 are secured to and are continuous with the carriage 99. A counterbalance is provided for the arms 147 and 148 to minimize the side thrust on the trunnions 101 and to this end the carriage 99, see Figures 2 and 6, supports an arm 149 having a counterbalance, indicated generally at 145, depending therefrom. A smaller counterbalance 150 may be mounted on the arm 149 and of such a shape as to clear the fluid coupling 93. A sliding bearing 149 is provided for the lower weight arm 148 so that the weight arm 51 may move freely with respect to the frame 49.

The end of the weight arm 51 adjacent the coal seam is provided with a weight 53 which is composed of plates 151, 152 and 153 welded to the arm members 147 and 148, see particularly Figure 4. The cavity thus formed is filled with a heavy metal cast therein, as at 154, of sufficient weight so that when weight arm 51 reciprocates with respect to the cutter head 54, a sufficiently large impulse is transmitted thereto through the linkage 127. A lead-antimony alloy is especially effective heavy metal for this purpose.

Referring now particularly to Figures 4, 16, 17 and 18, the plate members 136 and 137 are connected at their ends adjacent to the face of the coal seam by a pad member 156, by means of rivets or bolts 157. The cutter head 54 is provided with a locating boss 158 adapted to align with a recess 159 formed in a face 161 of the spacer member 156. The cutter head 54 is provided with a plurality of bolts 162 which secure the cutter head 54 to the spacer member 156.

The cutter head 54 is in the form of a generally dipper-shaped casting having a plurality of oppositely disposed pairs of cutter teeth 163 along its upper and lower edges which are offset a small amount from each other and which increase in spacing from cutter teeth 164 along the extreme forward edge of the cutter head 54 to the back of the cutter head 54 at the face 161 where it is joined to the pad member 156. The teeth 163 and 164 are adapted to create conditions of localized high stress in the coal seam adjacent the teeth 163 and 164 to cause the coal to fragment from the coal seam and to fall from the seam to the mine floor.

The teeth 164 fair into a curved surface 166 which widens from the cutter teeth 164 to the back of the cutter head 54. The teeth 163 are continuous with surfaces 165 which lie in parallel planes which diverge from the front to the back of the cutter head 54. The teeth 163 and 164 and their respective surfaces 165 and 166 act as a chisel when the cutter head 54 is subjected to impulses by the changing velocity of the weight 53. The contour of the surfaces 165 and 166 is such as to provide draft to prevent wedging of the cutter head in the coal seam.

*Crowd and buffer mechanism for the cutter head*

Mechanism is provided for overcoming the tendency of the cutter head 54 to be withdrawn from contact with the face of the coal seam by the accelarating movement of the weight 53 toward the cutter head 54, and for preventing the unimpeded movement forward of the cutter head 53 when coal is fragmented from the coal seam. As shown with particular reference to Figures 4, 12, 13, 14 and 15, the stiffener plates 142 which are connected to the plate-like members 136 and 137 are connected by a pin 167 to a link 168 which has a pivotal connection to a generally V-shaped cam block 169. The cam block 169 rides in a V-groove 171 formed in a cam guide 172. The cam block 169 is provided with metallic brake shoes 170 which are adapted at times to contact the sides of the V-groove 171 in the cam guide 172. The cam guide 172 is supported by mounting pins 173 and spacer elements 174 on a bracket 176 extending in a forward direction from the housing 49.

The cam 169 cooperates with a cam follower 177 having a cam roller 178 mounted on the end thereof. The cam follower 177 includes a rod 179 guided on a flange 181 within a circular guide 182 formed integrally on a bracket 183 extending transversely of the frame 49. A spring 184 encircles the rod 179 and abuts a stop 186 formed on a bracket 187 extending transversely from the frame 49 and spaced from the bracket 183.

The cam 169 is provided with out-turned ribs 185 to which are riveted brass bearing shoes 175 which are adapted at times to ride upon surfaces 190 of the cam guide 172. The apex of the V-groove 171 lies on a line 180 which is inclined with respect to the plane passing through the surfaces 190, so that as long as the cam roller 178 is at the bottom of the V of the cam 169 or is riding on the inner slope of the V, the shoes 175 are in contact with the surfaces 190. At times when the cam roller 178 is in contact with the outer slope of the cam, as seen in Figure 14, the brake shoes 170 are in contact with the sides of the V-groove 171 in the cam block 172.

The action of the crowd afforded by the fluid motor 62 varies with the resistance met by the cutter head 54. As long as the cutter head 54 is free from resistance, the cam roller 178 will rest in the bottom of the V-groove of the cam 169, but if at the start of the reciprocating cycle the cutter head 54 is in contact with the coal, the action of the crowd will force the roller 178 up near the top of the inner slope of the cam 169, and the cutter head 54 will press against the coal with a force equal to that received from the crowding action minus the force from the low acceleration of the weight 53.

This position of the crowd is maintained as long as the cutter head 54 does not penetrate the coal. When the cutter head advances through the coal, its speed may exceed the feeding speed of the crowding mechanism. Under such conditions, the roller 178 will ride to the low point on the V-cam 169. Again, when the advance of the cutter head is slowed by resistance of the coal, the roller will ride up the inner slope of the V-cam 169. If the coal breaks away when the combined inertia of the cutter head 54 and weight 53 are in a forward direction, the cutter head and the weight will lunge forward. When this occurs the cam 169 is pulled forward, so that the roller 178 will ride up the outer slope of the cam 169 as seen in Figure 14. Because of the slope of the V of the cam guide 172, the cam 169 rides off its bearing 175, and the brake lining 170 then contacts the sides of the V in the cam guide 172. The combined action of the brake and the roller against the outer slope of the V of the cam 169 will check the forward motion of the cutter head 54 and the weight without harm to the mechanism.

After this forward motion is checked, as above described, and the cutter head 54 is still free from the coal, the cam roller 178 will return to the bottom of the V of the cam 169 if its contribution to the checking or snubbing action was greater than that of the brake lining 170, but if the brake lining 170 contributed more to the checking action than the roller 178 on the cam 169, the roller 178 will remain in contact with the outer slope until the cutter head 54 comes into contact with the coal seam, at which time the crowding action will move the roller forward to the inner slope of the cam 169.

*Cuttings removal mechanism*

In order to remove coal which has been fragmented from the coal seam by the cutter head 54 as it is subject to impulses induced by the reciprocation of the weight 53, the turntable 43 is provided with means for removing the fragmented coal as it drops from the coal seam. To this end the forward end of the main frame 30 is provided with a plurality of radial spokes 188, see particularly Figures 4, 8 and 12, which are connected by a rim 189. The turntable 43 is provided with an arm 191 which is secured thereto by means of bolts 192. The arm 191 extends in a forward direction and underneath both the weight arm 51 and the cutter head arm 52, and is provided with a downward extending portion 193 continuous with a sweep 194 and adapted to have a certain amount of bearing contact with the rim 189. The end of the sweep 194 is connected by a pin 196 to a sweep 197 which has a portion 198 extending behind the sweep 194. It will be apparent as the turntable moves in a counterclockwise direction, see Figure 8, that the sweep 197 will gather the coal fragments. When the turntable 43 is moving in a clockwise direction, as seen in Figure 8, to return to a start position for a subsequent pass of the cutter head 54 across the coal seam, the sweep arm 197 will turn about the pin 196 to provide for the unimpeded movement of the sweep back to the start position until the turntable 43 is turning in a counterclockwise position as before.

Referring particularly to Figure 1, when the turntable 43 has completed its counterclockwise movement, the sweep arm 197 is then in position to deliver the coal carried thereby to the feeder head 198 of a shaker trough indicated generally at 199. The details of the construction of the shaker trough 199 form no part of the present invention, other forms of cuttings loading devices being capable of use for removing the fragmented coal from proximity to the machine according to the present invention.

*Operation*

In the operation of the continuous miner according to the present invention, the machine is advanced against the working face of a coal seam, as shown in Figure 1, and the cutter head 54 and the weight 53 move with the turntable 43 to the position "A" as seen in Figure 1. When power is provided by means of the drive motor 83 to the crankshafts 98 and 117, a reciprocating motion will be imparted to the weight arm 51 and its accompanying weight 53 by means of the linkage 127. Motive fluid is supplied to the fluid motor 62, shown in Figure 1, to crowd the cutter head 54 against the coal seam and thereby cause the reciprocation of the weight 53 to impart its changing momentum in the form of an impulse to the cutter head 54.

When the cutter head 54 and the weight 53 are free, that is, when the cutter head 54 is not in contact with the coal, the cutter head 54 and the weigh 53 will move toward and away from each other. However, the cutter head 54 will move a much greater portion of the relative travel of the weight 53 and cutter head 54 with respect to each other, since the cutter head 54 is lighter.

The point of connection 167 is without motion under this free running condition of the cutter head and weight. The link 168 is connected through the cam block 169 and the spring 184 to the turntable 43 and the frame 49. A crowding force is applied by means of the fluid motor 62 through the turntable 43 and the link 168 through the point 167 and thence to the cutter head 54, which crowding force is equal to the permissible reaction on the base of the machine at the treads 34.

As the frame 49 and the standards 48 turn with the turntable 43, the cutter head 54 approaches the coal seam with a reciprocating motion, the stroke of the cutter head 54 being nearly equal to the relative travel of the cutter head 54 and the weight 53. The weight 53 likewise has an oscillatory or reciprocating motion but with a very short stroke. When the cutter head 54 comes into contact with the coal seam, the stroke of its reciprocating motion decreases and the stroke of the weight 53 increases, until the resistance of the coal becomes equal to the low accelerating force of the weight 53. As long as the resistance of the coal exceeds the force of the low accelerating rate, the cutter head 54 will continue to make contact with the coal. In digging coal against a higher resistance, the advance of the cutter head 54 is intermittent while the feed by the fluid motor 62 for the crowd effect is reasonably constant. One purpose of the elastic connection afforded by the link 168, and the cam 169 and the spring 184 is to provide freedom for the intermittent advance of the pick, and to maintain crowding force against the coal which may be faster than the more uniform feed of the crowd. At the beginning of a cycle the weight 53 is accelerated toward the cutter head 54 and the reacting force from this acceleration is opposed by the crowding force. This crowding force induced by the fluid motor 62 causes compression of the spring 184, and as the crowding force is greater than the reacting force induced by the low acceleration of the weight 53, the cutter head 54 is held in contact with the coal with a force equal to their difference.

Near the end of the forward stroke the motion of the weight 53 is changed to rapid deceleration, and the force of the rapid deceleration plus the crowding force is applied to the coal. This force is maintained during the rapid deceleration and the rapid backward acceleration of the weight 53 and the cutter head 54 advances through the coal with increasing velocity. When the velocity of the cutter head 54 exceeds that caused by the crowding effect, the cam 169 and the spring 184 provides an override of the cutter head 54 with respect to the frame 49 and the turntable 43.

At the point where rapid backward relative acceleration of the weight 53 ceases with respect to the cutter head 54, the cutter head 54 is moving forward wtih considerable velocity. According to the present invention a definite relative motion of the cutter head 54 with respect to the weight 53 is provided, which would mean that the weight 53 would be moving backward relative to the cutter head 54, but the forward velocity of the cutter head 54 may be higher than the maximum relative velocity of the weight 53, so that the absolute motion of the weight 53 is still in a forward direction. From this point on the relative motion of the cutter head 54 with respect to the weight 53 is one of deceleration, and the relative forces are in the direction to retard the weight 53, but the forward momentum of the weight 53 and the cutter head 54 will cause the cutter head 54 to continue to advance with a decreasing velocity until it has come to a stop, where it remains in contact with the coal until the high forces are applied during the next cycle.

Obviously, the highest force that can be exerted by the cutter head 54 is when it is stalled against coal which it cannot penetrate. If the coal resistance is less than this stalling value, the cutter head 54 is accelerated through the coal and the high forces of deceleration and backward acceleration are reduced. This is because the relative rates of acceleration and deceleration of the cutter head with respect to the weight are fixed, but are reduced for the absolute rates by the acceleration of the cutter head.

The buffer mechanism is designed to correct for the tendency of the cutter head 54 to accelerate when resistance is no longer afforded by the coal seam. The cutter head 54 would normally lunge forward when resistance is no longer afforded by the coal seam, but the spring 184 and the follower 179 oppose such movement of the cutter head and the cam 169, since the spring 184 will be loaded in riding up onto the outer slope of the cam 169.

Such tendency of the cutter head 54 to lunge forward is also checked by the coaction of the brake lining 170 with the V-groove 171 which exerts a braking effect, thereby avoiding injury to the machine.

Referring now particularly to Figures 19 to 23 inclusive of the drawings, the operation obtaining under certain phases of the reciprocating cycle of the weight 53 will now be described. Figure 19 represents the start of the oscillatory cycle of the weight 53, when the weight 53 is at its most remote position with respect to the cutter head 54. Figure 20 represents the condition obtaining when the weight 53 has moved a distance as represented by 140° of rotation of the crankshaft 98. At this point, the weight 53 has been accelerated at a substantially uniform rate as determined by the contour of the variable speed gears 198, 199 and the linkage 127, see Figure 6. At this point, the weight 53 will begin to decelerate and the resulting change in momentum thereof will cause an impulse to be transmitted to the cutter head 54 to create a condition of localized stress against the coal seam, such impulse being transmitted to the cutter head 54 by means of the link 127 and the pivotal connection 121 between the cutter head arm 52 and the weight arm 51. However, the crowding effect afforded by the fluid motor 62 on the turntable 43 will cause the cam roller 178 to ride on the inner slope of the V-cam 169 until the crowding effect is balanced by the resistance afforded to the cutter head 54 by the coal and the reaction from the low acceleration of the weight 53 toward the cutter head 54.

Figure 21 shows the condition obtaining when the crankshaft 98 has rotated 180°, and the weight 53 is reversing its direction with respect to the cutter head 54. As has been explained, the reversal of direction of the weight 53 creates an impulse in the cutter head 54 through the medium of the linkage 127. Under the condition as shown in Figure 21 the cutter head 54 will have continued to advance because of the fragmentation of the coal, and the V-shaped cam 169 will have advanced therewith through the medium of the link 168, until the load in the spring 184 will have diminished. As the cutter head continues to advance rapidly, the roller 178 rides at a lower point on the inner surface of the V-cam 169.

Figure 22 shows the condition obtaining when the crankshaft 98 has rotated through an angle of 220° and the weight 53 is still continuing to separate with respect to the cutter head 54, the rate of such separation decreasing as determined by the contour of the variable speed gears 108 and 109 and linkage 127. Just prior to this condition, the cutter head 54 has advanced with respect to the coal, yet the crowd effect of the turntable 43 has not kept up with the advance of the cutter head through the coal, thus causing the cam roller 178 to ride still lower on the cam 169. At this point the coal has broken away from the coal seam.

Figure 23 shows the relative position of the cutter head 54 and the weight arm 53 when they are approaching their relative position of widest spacing, that is, when the crankshaft 98 has rotated through an angle of 270°. At this point the relative motion of the cutter head 54 and the weight 53 is away from each other. But, as the pick has been advancing in the coal at a rapid rate, the absolute motion of both the cutter head 54 and the weight 53 is in a forward direction. This causes the cam 169 to be pulled forward so that the roller 178 rides the outer slope thereof and the brake is applied as shown in Figures 23 and 14.

Figure 24 shows the relative position of the cutter head 54 and the weight 53 when resistance is no longer afforded against the cutter head 54, and both the cutter head 54 and the weight 53 start to reciprocate with respect to each other as soon as the coal is fragmented from the seam. When the machine is operated with the pick free from the coal, there is no resistance against the crowding action and the roller 178 rests in the bottom of the V-groove of the cam 169.

Figure 25 is similar to Figure 19 and shows the relative position of the cutter head 54 and the weight 53 when the cutter head 54 has ceased its free reciprocating movement and has been moved forward by the crowd of the fluid motor 62 against the turntable 43. As soon as the cutter head 54 is forced against the coal seam, the roller 178 will once more ride up the inner slope of the V-cam 169 as shown in Figure 25.

From the foregoing description it will be apparent that there has been provided a mining machine which enables coal to be fragmented from a coal seam by a cutter head adapted to create conditions of localized stress adjacent the cutter head, such conditions of localized stress being induced by impulses directed into the cutter head by the change in momentum of an oscillating weight connected by a linkage to the cutter head. It will also be apparent from the foregoing description that there has been provided a novel drive mechanism which will provide desired velocity characteristics to an oscillating weight, the changing momentum of the weight being adapted to be transmitted into a cutter head in the form of an impulse as determined by the change in momentum of said weight.

From the foregoing description, it will also be obvious that there has been provided a mining machine which will fragment coal from a vein or seam with a minimum amount of dust and fines, thereby resulting in coal of a higher commercial value.

While the invention has been herein described as especially adapted for use in a mining machine, its scope is not limited to such use inasmuch as the same principle of operation, wherein the change in momentum of a reciprocating weight is transferred to the cutter or work head through a linkage mechanism, can also be applied to other power-operated devices. Accordingly, the invention is not limited to the specific embodiment herein disclosed and described, excepting as defined in the appended claims.

I claim as my invention:

1. In a mechanical miner, a cutter head adapted to be moved into contact with a seam of frangible material, a weight adapted to reciprocate with respect to said cutter head, power means for imparting reciprocatory movement to said weight, and a linkage connecting said weight and said cutter head for transmitting an impulse into said cutter head from said weight, in response to changes in momentum of the latter.

2. In a mechanical miner, a cutter head adapted to be moved into contact with a seam of frangible material, a weight adapted to reciprocate with respect to said cutter head, power means for imparting reciprocatory movement to said weight for relative motion of said weight with respect to said cutter head, said power means providing for acceleration of said weight during the major portion of its travel when said weight is moving towards said cutter head and for providing rapid deceleration of said weight during the remaining portion of its travel towards said cutter head, and a linkage connecting said cutter head to said weight for transferring the change in momentum of said weight in the form of an impulse against said cutter head.

3. In a mechanical miner, a cutter head adapted to be moved into contact with a seam of frangible material, a weight adapted to reciprocate with respect to said cutter head, power means for imparting reciprocatory movement to said weight for relative motion of said weight with respect to said cutter head, said power means providing for acceleration of said weight during the major portion of its travel when said weight is moving towards said cutter head and for providing rapid deceleration of said weight during the remaining portion of its travel towards said cutter head, and for providing rapid acceleration away from said cutter head for a period substantially equal to the period of rapid deceleration of said weight towards said cutter head, and a linkage connecting said cutter head to said weight for transferring the change in momentum of said weight in the form of an impulse against said cutter head.

4. In a mechanical miner, a cutter head adapted to be moved into contact with a seam of frangible material, a weight adapted to reciprocate with respect to said cutter head, power means for imparting reciprocatory movement to said weight for relative motion of said weight with respect to said cutter head comprising a bearing support for said weight, a pair of spaced cranks mounted in said bearing support, variable speed gearing connecting said cranks to provide for changing velocity of one of said cranks with respect to the other of said cranks, a linkage connecting said cranks providing a pivotal support for a cutter head arm connected thereto, a pivoted connection between said bearing support and said cutter head arm, said cranks and said linkage providing for acceleration of said weight during the major portion of its travel when said weight is moving towards said cutter head and for providing rapid deceleration of said weight during the remaining portion of its travel towards said cutter head, and said cranks and said linkage forming a means for transferring the change in momentum of said weight in the form of an impulse against said cutter head.

5. In a mechanical miner, a cutter head adapted to be moved into contact with a seam of frangible material, a weight adapted to reciprocate with respect to said cutter head, power means for imparting reciprocatory movement to said weight for relative motion of said weight with respect to said cutter head comprising a bearing support for said weight, a pair of spaced cranks mounted in said bearing support, variable speed gearing connecting said cranks to provide for changing velocity of one of said cranks with respect to the other of said cranks, a linkage connecting said cranks providing a pivotal support for a cutter head arm connected thereto, a pivoted connection between said bearing support and said cutter head arm, said cranks and said linkage providing for acceleration of said weight during the major portion of its travel when said weight is moving towards said cutter head and for providing rapid deceleration of said weight during the remaining portion of its travel towards said cutter head, and for providing rapid acceleration away from said cutter head for a period substantially equal to the period of rapid deceleration of said weight towards said cutter head, and said cranks and said linkage forming a means for transferring the change in momentum of said weight in the form of an impulse against said cutter head.

6. In a mechanical miner, a cutter head adapted to be moved into contact with a seam of frangible material, a weight adapted to reciprocate with respect to said cutter head, power means for imparting reciprocatory movement to said weight for relative motion of said weight with respect to said cutter head comprising a bearing support for said weight, a pair of spaced cranks mounted in said bearing support, variable speed gearing connecting said cranks to provide for changing velocity of one of said cranks with respect to the other of said cranks, a linkage connecting said cranks providing a pivotal support for a cutter head arm connected thereto, a pivoted connection between said bearing support and said cutter head arm, said cranks and said linkage providing for acceleration of said weight during the major portion of its travel when said weight is moving towards said cutter head and for providing rapid deceleration of said weight during the remaining portion of its travel towards said cutter head, said cranks and said linkage being so arranged as to provide approximately uniform acceleration and deceleration of said weight towards and away from said cutter head, and said cranks and said linkage forming a means for transferring the change in momentum of said weight in the form of an impulse against said cutter head.

7. In a mechanical miner, a support arm for a cutter head adapted to be moved into contact with a seam of frangible material, a second support arm having a weight mounted thereon and adapted to reciprocate with respect to said cutter head, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage, said cranks and said linkage providing for acceleration of said weight during the major portion of its travel when said weight is moving towards said cutter head and for providing rapid deceleration of said weight during the remaining portion of its travel towards said cutter head, and said cranks and linkage forming a means for transferring the change in momentum of said weight in the form of an impulse against said cutter head.

8. In a mechanical miner, a support arm for a cutter head adapted to be moved into contact with a seam of frangible material, a second support arm having a weight mounted thereon and adapted to reciprocate with respect to said cutter head, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage, said cranks and said linkage providing for acceleration of said weight during the major portion of its travel when said weight is moving towards said cutter head and for providing rapid deceleration of said weight during the remaining portion of its travel towards said cutter head, and for providing rapid acceleration away from said cutter head for a period substantially equal to the period of rapid deceleration of said weight towards said cutter head, and said cranks and linkage forming a means for transferring the change in momentum of said weight in the form of an impulse against said cutter head.

9. In a mechanical miner, a support arm for a cutter head adapted to be moved into contact with a seam of frangible material, a second support arm having a weight mounted thereon and adapted to reciprocate with respect to said cutter head, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage, said cranks and said linkage providing for acceleration of said weight during the major portion of its travel when said weight is moving towards said cutter head and for providing rapid deceleration of said weight during the remaining portion of its travel towards said cutter head, said cranks and said linkage being so arranged as to provide approximately uniform acceleration and deceleration of said weight towards and away from said cutter head, and said cranks and linkage forming a means for transferring the change in momentum of said weight in the form of an impulse against said cutter head.

10. In a mechanical miner, a support arm for a cutter head adapted to be moved into contact with a seam of frangible material, a second support arm having a weight mounted thereon and adapted to reciprocate with respect to said cutter head, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage being on a radius with a center corresponding to the point of pivotal connection between said arms and having a motion which is proportional to the velocity of the weight when said cutter head is in contact with said seam.

11. In a mechanical miner, a support arm for a cutter head adapted to be moved into contact with a seam of frangible material, a second support arm having a weight mounted thereon and adapted to reciprocate with respect to said cutter head, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage being on a radius with a center corresponding to the point of pivotal connection between said arms and having a motion which is proportional to the velocity of the weight when said cutter head is in contact with said seam, said cranks and said linkage providing for acceleration of said weight during the major portion of its travel when said weight is moving towards said cutter head and for providing rapid deceleration of said weight during the remaining portion of its travel towards said cutter head, and said cranks and linkage forming a means for transferring the change in momentum of said weight in the form of an impulse against said cutter head.

12. In a mechanical miner, a support arm for a cutter head adapted to be moved into contact with a seam of frangible material, a second support arm having a weight mounted thereon and adapted to reciprocate with respect to said cutter head, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage being on a radius with a center corresponding to the point of pivotal connection between said arms and having a motion which is proportional to the velocity of the weight when said cutter head is in contact with said seam, said cranks and said linkage providing for acceleration of said weight during the major portion of its travel when said weight is moving towards said cutter head and for providing rapid deceleration of said weight during the remaining portion of its travel towards said cutter head, and for providing rapid acceleration away from said cutter head for a period substantially equal to the period of rapid deceleration towards said cutter head, and said cranks and linkage forming a means for transferring the change in momentum of said weight in the form of an impulse against said cutter head.

13. In a mechanical miner, a support arm for a cutter head adapted to be moved into contact with a seam of frangible material, a second support arm having a weight mounted thereon and adapted to reciprocate with respect to said cutter head, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage being on a radius with a center corresponding to the point of pivotal connection between said arms and having a motion which is proportional to the velocity of the weight when said cutter head is in contact with said seam, said cranks and said linkage providing for acceleration of said weight during the major portion of its travel when said weight is moving towards said cutter head and for providing rapid deceleration of said weight during the remaining portion of its travel towards said cutter head, said cranks and said linkage being so arranged as to provide approximately uniform acceleration and deceleration of said weight towards and away from said cutter head, and said cranks and linkage forming a means for transferring the change in momentum of said weight in the form of an impulse against said cutter head.

14. In a mechanical miner, a frame having mine floor engaging means for moving said miner along a miner floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocatory movement to said weight and weight arm, and a linkage mechanism for transmitting an impulse from said weight and said weight arm into said cutter head.

15. In a mechanical miner, a frame having mine floor engaging means for moving said miner along a mine floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting repiractory movement to said weight and weight arm, and a linkage mechanism for transmitting an impulse from said weight and said weight arm into said cutter head, and means for rotating said turntable for crowding said cutter head against said seam.

16. In a mechanical miner, a frame having mine floor engaging means for moving said miner along a miner floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocatory movement to said weight and weight arm, a linkage mechanism for transmitting an impulse from said weight and said weight arm into said cutter head, and means for rotating said turntable for crowding said cutter head against said seam, and a resilient connection between said cutter head arm and said support for providing over-travel of said turntable and said support when said cutter head is encountering resistance afforded by said seam, and for providing for movement of said cutter head with respect to said turntable and said support when said cutter head is no longer encountering resistance afforded by said seam.

17. In a mechanical miner, a frame having mine floor engaging means for moving said miner along a mine floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocatory movement to said weight and weight arm, a linkage mechanism for transmitting an impulse from said weight and said weight arm into said cutter head, and means for rotating said turntable for crowding said cutter head against said seam, and a resilient connection between said cutter head arm and said support for providing over-travel of said turntable and said support when said cutter head is encountering resistance afforded by said seam, and for providing for movement of said cutter head with respect to said turntable and said support when said cutter head is no longer encountering resistance afforded by said seam, and a brake cooperating with said resilient connection for limiting the amount of movement of said cutter head when resistance to said cutter head is no longer afforded by said seam.

18. In a mechanical miner, a frame having mine floor engaging means for moving said miner along a mine floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocatory movement to said weight and weight arm, and a linkage mechanism for transmitting an impulse from said weight and said weight arm into said cutter head, and means for raising and lowering the support together with the cutter head arm and the weight arm according to the height of material being fragmented from said seam.

19. In a mechanical miner, a frame having mine floor engaging means for moving said miner along a mine floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocatory movement to said weight and weight arm, and a linkage mechanism for transmitting an impulse from said weight and said weight arm into said cutter head, means for rotating said turntable for crowding said cutter head against said seam, and means for raising and lowering the support together with the cutter head arm and the weight arm according to the height of material being fragmented from said seam.

20. In a mechanical miner, a frame having mine floor engaging means for moving said miner along a mine floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocatory movement to said weight and weight arm, and a linkage mechanism for transmitting an impulse from said weight and said weight arm into said cutter head, means for rotating said turntable for crowding said cutter head against said seam, means for raising and lowering the support together with the cutter head arm and the weight arm according to the height of material being fragmented from said seam, and a resilient connection between said cutter head arm and said support for providing over-travel of said turntable and said support when said cutter head is encountering resistance afforded by said seam, and for providing for movement of said cutter head with respect to said turntable and said support when said cutter head is no longer encountering resistance afforded by said material.

21. In a mechanical miner, a frame having mine floor engaging means for moving said miner along a mine floor, a turntable mounted for rotative movement with respect to said frame, a support for a cutter head arm mounted on said turntable and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocatory movement to mentum into said cutting head in the form of an impulse to create a condition of localized high stress in said seam adjacent said cutting head, power means for imparting reciprocatory movement to said weight for relative motion of said weight with respect to said cutter head, said power means providing for acceleration of said weight during the major portion of its travel when said weight is moving towards said cutter head and for providing for rapid deceleration of said weight during the remaining portion of its travel towards said cutter head, and a linkage connecting said cutter head to said weight for transferring the change in momentum of said weight in the form of an impulse against said cutter head.

28. In a mining machine of the class described having a crowding mechanism, a hoist mechanism and an advancing mechanism for moving said mining machine with respect to the working face of a seam of frangible material, a cutter head adapted to be moved into contact with said working face and to be moved with respect to said working face by said crowding mechanism, said hoist mechanism and said advancing mechanism, a weight adapted to reciprocate with respect to said cutter head and impart its momentum into said cutting head in the form of an impulse to create a condition of localized high stress in said coal adjacent said cutting head, power means for imparting reciprocatory movement to said weight for relative motion of said weight with respect to said cutter head comprising a bearing support for said weight, a pair of spaced cranks mounted in said bearing support, variable speed gearing connecting said cranks to provide for changing velocity of one of said cranks with respect to the other of said cranks, a linkage connecting said cranks providing a pivotal support for a cutter head arm connected thereto, a pivoted connection between said bearing support and said cutter head arm, said cranks and said linkage providing for acceleration of said weight during the major portion of its travel when said weight is moving towards said cutter head and for providing rapid deceleration of said weight during the remaining portion of its travel towards said cutter head, and said cranks and said linkage forming a means for transferring the change in momentum of said weight in the form of an impulse against said cutter head.

29. In a mining machine of the class described having a crowding mechanism, a hoist mechanism and an advancing mechanism, a hoist mechanism and an advancing mechanism for moving said mining machine with respect to the working face of a seam of frangible material, a support arm for a cutter head adapted to be moved into contact with the working face of said seam and to be moved with respect to said working face by said crowding mechanism, said hoist mechanism and said advancing mechanism, a second support arm having a weight mounted thereon and adapted to reciprocate with respect to said cutter head and impart its changing momentum into said cutter head in the form of an impulse to create a condition of localized high stress in said seam adjacent said cutter head and fragment material from said seam, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage, said cranks and said linkage providing for acceleration of said weight during the major portion of its travel when said weight is moving towards said cutter head and for providing rapid negative acceleration of said weight during the remaining portion of its travel towards said cutter head, and said cranks and linkage forming a means for transferring the change in momentum of said weight in the form of an impulse against said cutter head.

30. In a mining machine of the class described having a crowding mechanism, a hoist mechanism and an advancing mechanism, for moving said mining machine with respect to the working face of a seam of frangible material, a support arm for a cutter head adapted to be moved into contact with said working face and to be moved with respect to said working face by said crowding mechanism, said hoist mechanism and said advancing mechanism, a second support arm having a weight mounted thereon and adapted to reciprocate with respect to said cutter head and impart its changing momentum into said cutter head in the form of an impulse to create a condition of localized high stress in said seam adjacent said cutter head and fragment material from said seam, a pivotal connection between said arms, a bearing support for said second arm, and means for providing reciprocatory movement of said weight with respect to said cutter head comprising a pair of cranks having crank velocities which vary with respect to each other, a linkage connecting said cranks, a pivotal connection between said first support arm and said linkage, said cranks and said linkage providing for acceleration of said weight during the major portion of its travel when said weight is moving towards said cutter head and for providing rapid negative acceleration of said weight during the remaining portion of its travel towards said cutter head, and said cranks and linkage forming a means for transferring the change in momentum of said weight in the form of an impulse against said cutter head, the point of connection of said first support arm and said linkage being on a radius with a center corresponding to the point of pivotal connection between said arms and having a motion which is proportional to the velocity of the weight when said cutter head is in contact with said working face.

31. Mechanism of the class described for imparting a varying stress on a workpiece comprising a stress-applying member adapted to be moved into contact with said workpiece, a weight adapted to reciprocate with respect to said stress-applying member and impart its changing momentum into said stress-applying member in the form of an impulse to create a condition of varying stress on said workpiece, power means for imparting reciprocatory movement to said weight, and a linkage mechanism for transmitting the impulse from said weight into said stress-applying member.

32. Mechanism of the class described for imparting a varying stress on a workpiece comprising a stress-applying member adapted to be moved into contact with said workpiece, a weight adapted to reciprocate with respect to said stress-applying member and impart its changing momentum into said stress-applying member in the form of an impulse to create a condition of vary-said weight and weight arm, and a linkage mechanism for transmitting an impulse from said weight and said weight arm into said cutter head, means for rotating said turntable for crowding said cutter head against said seam, means for raising and lowering the support together with the cutter head arm and the weight arm according to the height of material being fragmented from said seam, and a resilient connection between said cutter head arm and said support for providing over-travel of said turntable and said support when said cutter head is encountering resistance afforded by said seam, and for providing for movement of said cutter head with respect to said turntable and said support when said cutter head is no longer encountering resistance afforded by said material, and a brake cooperating with said resilient connection for limiting the amount of movement of said cutter head when material is fragmented from said seam.

22. In a mechanical miner, a frame having mine floor engaging means for moving said miner along a mine floor, a turntable mounted for rotative movement with respect to said frame, a support for a cutter head arm and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocating movement to said weight and weight arm, and a linkage mechanism for transmitting an impulse from said weight and said weight arm into said cutter head, and means for retracting said support on said turntable at the end of the rotative movement of said turntable.

23. In a mechanical miner, a frame having mine floor engaging means for moving said miner along a mine floor, a turntable mounted for rotative movement with respect to said frame, a support for a cutter head arm and a weight arm mounted for reciprocatory movement with respect to said cutter head arm, a cutter head mounted at the end of said cutter head arm adapted to be moved into contact with a seam of frangible material, a weight mounted at the end of said weight arm for imparting its changing momentum to said cutter head in the form of an impulse to create a condition of localized high stress in said seam adjacent said cutter head and fragment material from said seam, power means mounted on said turntable for imparting reciprocating movement to said weight and said weight arm, and a linkage mechanism for transmitting an impulse from said weight and said weight arm into said cutter head, and means operable by the turntable in its movement for removing fragmented material from proximity to the face of said seam.

24. In a mining machine of the class described having a crowding mechanism, a hoist mechanism and an advancing mechanism for moving said mining machine with respect to the working face of a seam of frangible material, a cutter head adapted to be moved into contact with said working face and to be moved with respect to said working face by said crowding mechanism, said hoist mechanism and said advancing mechanism, a weight adapted to reciprocate with respect to said cutter head and impart its momentum into said cutting head in the form of an impulse to create a condition of localized high stress in said seam adjacent said cutting head, power means for imparting reciprocatory movement to said weight, and a linkage mechanism for transferring an impulse into said cutting head from said reciprocating weight.

25. In a mining machine of the class described having a crowding mechanism, a hoist mechanism and an advancing mechanism for moving said mining machine with respect to the working face of a seam of frangible material, a cutter head adapted to be moved into contact with said working face and to be moved with respect to said working face by said crowding mechanism, said hoist mechanism and said advancing mechanism, a weight adapted to reciprocate with respect to said cutter head and impart its momentum into said cutting head in the form of an impulse to create a condition of localized high stress in said seam adjacent said cutting head, power means for imparting reciprocatory movement to said weight, a linkage mechanism for transferring an impulse into said cutting head from said reciprocating weight, and a resilient connection between said cutter head arm and said support for providing over-travel of said turntable and said support when said cutter head is encountering resistance afforded by said material, and for providing for movement of said cutter head with respect to said turntable and said support when said cutter head is no longer encountering resistance afforded by said material.

26. In a mining machine of the class described having a crowding mechanism, a hoist mechanism and an advancing mechanism for moving said mining machine with respect to the working face of a seam of frangible material, a cutter head adapted to be moved into contact with said working face and to be moved with respect to said working face by said crowding mechanism, said hoist mechanism and said advancing mechanism, a weight adapted to reciprocate with respect to said cutter head and impart its momentum into said cutting head in the form of an impulse to create a condition of localized high stress in said seam adjacent said cutting head, power means for imparting reciprocatory movement to said weight, a linkage mechanism for transferring an impulse into said cutting head from said reciprocating weight, and a resilient connection between said cutter head arm and said support for providing over-travel of said turntable and said support when said cutter head is encountering resistance afforded by said material, and for providing for movement of said cutter head with respect to said turntable and said support when said cutter head is no longer encountering resistance afforded by said seam, and a brake cooperating with said resilient connection for limiting the amount of movement of said cutter head when material is fragmented from said seam.

27. In a mining machine of the class described having a crowding mechanism, a hoist mechanism and an advancing mechanism for moving said mining machine with respect to the working face of a seam of frangible material, a cutter head adapted to be moved into contact with said working face and to be moved with respect to said working face by said crowding mechanism, said hoist mechanism and said advancing mechanism, a weight adapted to reciprocate with respect to said cutter head and impart its moing stress on said workpiece, power means for imparting reciprocatory movement to said weight for relative motion of said weight with respect to said stress-applying member, said power means providing for acceleration of said weight during the major portion of its travel when said weight is moving towards said stress-applying member and for providing rapid deceleration of said weight during the remaining portion of its travel towards said stress-applying member, and for providing rapid acceleration away from said stress-applying member for a period substantially equal to the period of rapid deceleration towards said stress-applying member, and for providing further deceleration away from said stress-applying member during the remaining portion of its travel at a rate substantially equal to the acceleration during the said major portion of travel towards said stress-applying member, and a linkage connecting said stress-applying member to said weight for transferring the change in momentum of said weight in the form of an impulse against said stress-applying member.

33. Mechanism of the class described for imparting a varying stress on a workpiece comprising a stress-applying member adapted to be moved into contact with said workpiece, a weight adapted to reciprocate with respect to said stress-applying member and impart its changing momentum into said stress-applying member in the form of an impulse to create a condition of varying stress on said workpiece, power means for imparting reciprocatory movement to said weight for relative motion of said weight with respect to said stress-applying member comprising a bearing support for said weight, a pair of spaced cranks mounted in said bearing support, variable speed gearing connecting said cranks to provide for changing velocity of one of said cranks with respect to the other of said cranks, a linkage connecting said cranks providing a pivotal support for said stress-applying member, a pivoted connection between said bearing support and said stress-applying member, said cranks and said linkage providing for acceleration of said weight during the major portion of its travel when said weight is moving towards said stress-applying member and for providing rapid deceleration of said weight during the remaining portion of its travel towards said stress-applying member and for providing rapid acceleration away from said stress-applying member for a period substantially equal to the period of rapid deceleration towards said stress-applying member.

34. Mechanism of the class described for imparting a varying stress on a workpiece comprising a stress-applying arm adapted to be moved into contact with said workpiece, a weight arm adapted to reciprocate with respect to said stress-applying arm and impart its changing momentum into said stress-applying arm in the form of an impulse to create a varying stress on said workpiece, a pivotal connection between said arms, a bearing support for said second named arm, and means for providing reciprocatory movement of said weight arm with respect to said stress-applying arm comprising a pair of cranks having crank velocities which vary with respect to each other, a linkage connecting said cranks, a pivotal connection between said stress-applying arm and said linkage being on a radius with a center corresponding to the point of pivotal connection between both of said arms and having a motion which is proportional to the velocity of said weight when said stress-applying arm is in contact with said workpiece.

35. A machine for producing a high pressure or torque with a reaction against said machine less than one-half of said pressure or torque consisting of a tool adapted to be moved into contact with the work, a reciprocating weight connected to the tool by a linkage producing a movement of said weight toward said tool with substantially uniform acceleration over more than one-half its travel toward said tool and with substantially uniform deceleration at more than said rate of acceleration for the remainder of the travel of said weight toward said tool, said linkage producing substantially uniform acceleration of said weight away from said tool for less than one-half of its backward travel at a rate substantially equal to the deceleration rate toward said tool and a substantially uniform deceleration for the remainder of its backward stroke equal to the acceleration rate toward the tool, the inertia of said weight being transmitted through said linkage to said tool, and means for providing a crowding force against said tool in excess of the forces derived as a result of movement of said weight during travel at said lower rates of acceleration and deceleration.

36. The invention as defined in claim 35 characterized by varying speed gearing associated with said linkage for varying the acceleration of said weight during its forward and backward movement.

37. The invention as defined in claim 36 characterized by two cranks driven by said gearing and connected by said linkage for varying the acceleration of said weight during its forward and backward movement.

38. A machine for producing a pressure or torque with a reaction against the supports of said machine equal to less than one-half of said pressure or torque comprising a tool adapted to be moved into contact with a work piece, a reciprocating weight connected to said tool by a linkage arranged to reverse the direction of travel of said weight, said linkage being constructed and arranged to move said weight toward said tool at substantially uniform rates of low acceleration and high deceleration and to reverse the direction of movement of said weight away from said tool at substantially uniform rates of high acceleration and low deceleration in the order named, the inertia of said weight being transmitted to the tool through said linkage, and means for providing a crowding force against said tool in excess of the forces derived as a result of the low acceleration and low deceleration of said weight.

39. The invention as defined in claim 38 characterized by varying speed gearing associated with said linkage for varying the acceleration and deceleration of said weight during its forward and reverse movement.

40. The invention as defined in claim 39 characterized by two cranks driven by said gearing and connected by said linkage for varying the acceleration and deceleration of said weight during its forward and reverse movement.

WILLIAM W. SLOANE

No references cited.